US012682558B2

(12) United States Patent
Kozlowski et al.

(10) Patent No.: US 12,682,558 B2
(45) Date of Patent: Jul. 14, 2026

(54) RENDERING 3D CURVES USING ORTHOGONAL TRIANGLE STRIPS

(71) Applicant: NVIDIA Corporation, Santa Clara, CA (US)

(72) Inventors: Pawel Kozlowski, Truckee, CA (US); David Augustus Hart, Salt Lake City, UT (US)

(73) Assignee: NVIDIA Corporation, Santa Clara, CA (US)

( * ) Notice: Subject to any disclaimer, the term of this patent is extended or adjusted under 35 U.S.C. 154(b) by 132 days.

(21) Appl. No.: 18/825,089

(22) Filed: Sep. 5, 2024

(65) Prior Publication Data

US 2026/0065585 A1     Mar. 5, 2026

(51) Int. Cl.
*G06T 15/80*          (2011.01)
(52) U.S. Cl.
CPC ..................................... *G06T 15/80* (2013.01)
(58) Field of Classification Search
None
See application file for complete search history.

(56) References Cited

U.S. PATENT DOCUMENTS

| | | | |
|---|---|---|---|
| 7,142,206 B1 | 11/2006 | Moreton | |
| 8,698,808 B2 | 4/2014 | Kilgard | |
| 9,384,570 B2 | 7/2016 | Bolz | |
| 11,651,520 B2 | 5/2023 | Kilgard | |
| 11,769,298 B2 | 9/2023 | Kilgard | |
| 2015/0018713 A1 | 1/2015 | Callede et al. | |
| 2021/0174584 A1 | 6/2021 | Kilgard | |
| 2022/0058868 A1* | 2/2022 | Kilgard | ................... G06T 11/23 |

* cited by examiner

*Primary Examiner* — Yanna Wu
(74) *Attorney, Agent, or Firm* — Foley & Lardner LLP

(57)          ABSTRACT
Various examples, systems, and methods are disclosed relating to orthogonal triangle strips. A first computing system can execute one or more operations to obtain an approximation of a three-dimensional (3D) curve including a plurality of linear segments. The first computing system can execute one or more operations to determine two quadrilateral primitives (quads) for each of the plurality of linear segments using a plurality of triangle primitives, wherein each of the two quads includes two of the plurality of triangle primitives, wherein the two quads corresponding to each linear segment of the plurality of linear segments are angled relative to one another and extend along the corresponding linear segment. The first computing system can execute one or more operations to render the two quads for each of the plurality of linear segments.

20 Claims, 16 Drawing Sheets

100

100

300

310

Obtain an approximation of a curve including a
plurality of linear segments

320

Determine two quadrilateral primitives (quads) for each
of the plurality of linear segments

330

Render the two quads for each of the plurality of linear segments

408

Cross Section

OTS
Scattering Ray Origin Offset

504

Face Normal

OTS
Shading Normals

502

LSS
Shading Normals

500

RENDERING 3D CURVES USING ORTHOGONAL TRIANGLE STRIPS

BACKGROUND

Rendering high-quality three-dimensional (3D) curves presents challenges. Curve data, which is used for accurate and realistic rendering, is often processed through separate and fragmented methods, leading to inefficiencies and increased computational demands. These methods can be broadly categorized into non-linear and linear approaches, each with its own set of limitations. Non-linear methods utilize custom software rasterizers or intersection programs, resulting in slower performance and increased complexity. Linear methods utilize more memory and may suffer from potential loss of visual fidelity due to the need for finer sampling to achieve smooth appearances. Techniques such as tessellated polygonal tubes and camera-facing quadrilateral primitives (quads) are commonly used but come with limitations, including high memory consumption and/or the necessity for per-frame re-orientation when the camera or the curves move. These challenges affect the effectiveness of systems in producing high-quality 3D curves, impacting the accuracy and efficiency of curve rendering in real-time or near real-time environments.

SUMMARY

Embodiments of the present disclosure relate to the rendering and optimization of three-dimensional (3D) curves. In contrast to conventional systems, which exhibit limitations in efficiently rendering high-quality curves that are consistent across multiple views, the systems and methods described herein can address these limitations through integrated tessellation, shading, and optimization techniques. Embodiments of the present disclosure provide more accurate and resource-efficient curve rendering. For instance, the systems and methods can approximate a curve using a plurality of linear segments, determine two quads for one or more (e.g. each) of the linear segments, and apply proxy shading normals to ensure high fidelity and consistency. Furthermore, by combining these processes and reducing or eliminating the need for separate data manipulation, the computing systems and methods can maintain reliable curve rendering even in the presence of complex geometries and dynamic viewing angles. This provides improved systems and methods for rendering and optimizing 3D curves across diverse applications.

At least one embodiment relates to a system including one or more processors to execute operations. The one or more processors can execute operations to obtain an approximation of a three-dimensional (3D) curve including a plurality of linear segments. The one or more processors can execute one or more operations to determine two quadrilateral primitives (quads) for one or more (e.g., each) of the plurality of linear segments using a plurality of triangle primitives, wherein one or more of the two quads includes two of the plurality of triangle primitives, wherein the two quads corresponding to one or more (e.g., each) linear segments of the plurality of linear segments are angled relative to one another and extend along (e.g., each of) the corresponding linear segment. The one or more processors can execute one or more operations to render the two quads one or more (e.g., each) of the plurality of linear segments.

In some embodiments, the one or more operations to shade the two quads include operations to calculate a plurality of proxy shading normals using a proxy infinite cone, corresponding to a plurality of hit points, to approximate an appearance of convex curve segments or round curve segments. In some embodiments, the curve includes a piecewise linear curve including the plurality of linear segments, and the operations executed by the one or more processors further include one or more operations to apply a radius expansion factor to the plurality of linear segments to match an average width of the plurality of linear segments to an intended radius from a plurality of viewing angles.

In some embodiments, at least one of one or more (e.g., each) of the two quads is positioned on a corresponding linear segment of the plurality of linear segments, one or more (e.g., each) of the two quads spans the corresponding linear segment of the plurality of linear segments, or one or more (e.g., each) of the plurality of linear segments is defined by two vertices, and the two vertices define midpoints of parallel edges defining one or more (e.g., each) quads of the two quads. In some embodiments, the two quads are transverse relative to one another. In some embodiments, the parallel edges defining one or more (e.g., each) quads of the two quads intersect at an angle to form a cross-sectional view transversing along one or more (e.g., each) of the plurality of linear segments.

In some embodiments, the two quads are orthogonal to one another. In some embodiments, the two vertices are at least one of (i) shared between one or more adjacent linear segments of the plurality of linear segments or (ii) independently positioned for one or more (e.g., each) of the plurality of linear segments. In some embodiments, one or more (e.g., each) of the two quads has a length that is same as (equivalent to) a length of a corresponding linear segment of the plurality of linear segments, and wherein one or more of the plurality of linear segments includes a varying radius. In some embodiments, one or more (e.g., each) of the two quads has a first width ($w0$) at a first vertex of the corresponding linear segment of the plurality of linear segments and a second width ($w1$) at a second vertex of the corresponding linear segment of the plurality of linear segments.

In some embodiments, one or more (e.g., each) of the two quads has a width that is equivalent to a diameter of a corresponding linear segment of the plurality of linear segments. In some embodiments, one or more (e.g., each) of the two quads is centered along the width of the corresponding linear segment of the plurality of linear segments. In some embodiments, the plurality of linear segments includes a first linear segment and a second linear segment connected to the first linear segment. In some embodiments, the two quads for the first linear segment and the two quads for the second linear segment are disjointed.

In some embodiments, the plurality of linear segments includes a first linear segment and a second linear segment connected to the first linear segment. In some embodiments, at least one the two quads for the first linear segment and at least one the two quads for the second linear segment form a joint. In some embodiments, the curve represents one or more of hair, fur, grass, wireframe rendering, 3D path rendering, 3D font rendering, 3D line drawings, carpet, lint, or cables.

The processors, systems, and/or methods described herein can be implemented by or included in at least one a control system for an autonomous or semi-autonomous machine. The system can include a control system for an autonomous or semi-autonomous machine. The system can include a perception system for an autonomous or semi-autonomous machine. The system can include a system implemented using a robot. The system can include an aerial system. The system can include a medical system. The system can include a boating system. The system can include a smart area monitoring system. The system can include a system for performing deep learning operations. The system can include a system for performing simulation operations. The system can include a system for generating or presenting virtual reality (VR) content, augmented reality (AR) content, or mixed reality (MR) content. The system can include a system for performing digital twin operations. The system can include a system implemented using an edge device. The system can include a system incorporating one or more virtual machines (VMs). The system can include a system for generating synthetic data. The system can include a system implemented at least partially in a data center. The system can include a system for performing conversational artificial intelligence (AI) operations. The system can include a system for performing generative AI operations. The system can include a system implementing language models. The system can include a system for performing one or more operations using one or more vision language models (VLMs). The system can include a system for performing one or more operations using one or more large language models (LLMs). The system can include a system implementing multi-modal language models. The system can include a system for hosting one or more real-time streaming applications. The system can include a system for performing light transport simulation. The system can include a system for performing collaborative content creation for 3D assets. The system can include a system implemented at least partially using cloud computing resources.

At least one embodiment relates to one or more processors. The one or more processors can include one or more circuits. The one or more circuits can obtain an approximation of a three-dimensional (3D) curved structure having a plurality of linear segments. The one or more circuits can determine two quadrilateral primitives (quads) for one or more (e.g., each) of the plurality of linear segments using a plurality of triangle primitives, one or more (e.g., each) of the two quads including two of the plurality of triangle primitives, wherein the two quads corresponding to a particular linear segment of the plurality of linear segments are angled relative to one another and extend along the particular linear segment. The one or more circuits can render the two quads for one or more (e.g., each) of the plurality of linear segments using a shader.

In some embodiments, the one or more circuits are to shade the two quads by calculating a plurality of proxy shading normals using a proxy infinite cone, corresponding to a plurality of hit points, to approximate an appearance of convex curve segments or round curve segments. In some embodiments, the curved structure includes a piecewise linear curve including the plurality of linear segments. In some embodiments, a radius expansion factor is applied to the plurality of linear segments to match an average width of the plurality of linear segments to an intended radius from a plurality of viewing angles.

In some embodiments, at least one of one or more (e.g., each) of the two quads is positioned on a corresponding linear segment of the plurality of linear segments, one or more (e.g., each) of the two quads spans the corresponding linear segment of the plurality of linear segments, or one or more (e.g., each) of the plurality of linear segments is defined by two vertices, and the two vertices define midpoints of parallel edges defining one or more (e.g., each) of the two quads. In some embodiments, the two quads are transverse relative to one another. In some embodiments, the two vertices on one or more (e.g., each) of the two quads intersect at an angle to form a cross-sectional view transversing along one or more (e.g., each) of the plurality of linear segments.

In some embodiments, the two quads are orthogonal to one another. In some embodiments, the two vertices are at least one of (i) shared between one or more adjacent linear segments of the plurality of linear segments or (ii) independently positioned for one or more (e.g., each) of the plurality of linear segments. In some embodiments, one or more (e.g., each) of the two quads has a length that is same as a length of a corresponding linear segment of the plurality of linear segments, and wherein one or more (e.g., each) of the plurality of linear segments includes a varying radius. In some embodiments, one or more (e.g., each) of the two quads has a first width ($w0$) at a first vertex of the corresponding linear segment of the plurality of linear segments and a second width ($w1$) at a second vertex of the corresponding linear segment of the plurality of linear segments.

At least one embodiment relates to a method. The method can include approximating, using one or more processors, a three dimensional (3D) curve including a plurality of linear segments. The method can include determining, using the one or more processors, at least two quadrilateral primitives (quads) for one or more (e.g., each) of the plurality of linear segments using a plurality of triangle primitives, one or more (e.g., each) of the at least two quads including at least two of the plurality of triangle primitives, wherein the at least two quads corresponding to the same linear segment of the plurality of linear segments extend along the same direction as the corresponding linear segment and are angled relative to one another. The method can include rendering, using a shader executed using the one or more processors, the two quads for one or more (e.g., each) of the plurality of linear segments.

BRIEF DESCRIPTION OF THE DRAWINGS

The present systems and methods for rendering 3D curve primitives using DOTS and/or JOTS is described in detail below with reference to the attached drawing figures, wherein.

DETAILED DESCRIPTION

Figure 1:
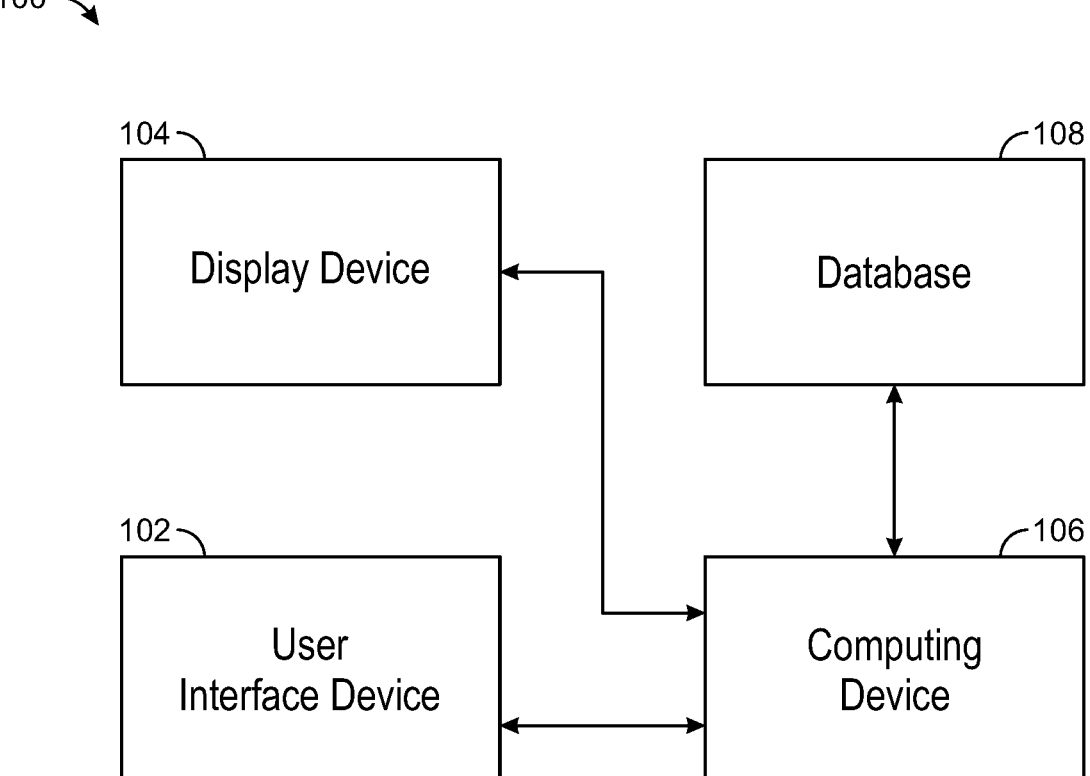
FIG. 1 is a block diagram of an example environment for performing operations on strand-based objects, in accordance with some embodiments of the present disclosure.

Rendering three-dimensional (3D) curves with thickness for objects such as hair, fur, grass, and/or other strand-based objects is typically a challenging task as significant memory and computational resources are required, especially in scenarios in which real-time rendering is required such as in video games. In films, electronic graphic games, animations, and other media and entertainment applications, curves can be represented using cubic curve types such as Bezier, B-spline, or Catmull-Rom spline. As a result, during rendering, cubic curves can be dynamically converted into piecewise linear splines, allowing the original cubic curves to be used for simulation and animation while minimizing memory and computational resources needed solely for rendering.

The embodiments disclosed herein are directed to rendering of objects with curves using representations of the curves as disjoint orthogonal triangle strips (DOTS) and/or joint orthogonal triangle strips (JOTS). Embodiments of the present disclosure are capable of being deployed in real-time, based on triangle rendering hardware (e.g., NVIDIA RTX). For instance, DOTS and/or JOTS can be implemented using triangle hardware acceleration for improved performance while at the same time minimizing the number of triangles used and avoid per-camera update. Further, DOTS and/or JOTS can provide an alternative solution for hardware-accelerated curve rendering in the absence of new hardware acceleration hardware or techniques. That is, embodiments disclosed relate to systems and methods for real-time rendering of three-dimensional (3D) curve primitives such as fur, hair, grass, wireframe rendering, 3D path or font rendering, 3D line drawings, carpet, lint, cables, and any other strand-based objects using DOTS and/or JOTS. DOTS and/or JOTS can use existing hardware for triangle rendering, such as NVIDIA RTX architectures, to achieve high performance and realistic visual quality without the high computational overhead typically associated with rendering non-linear curves.

Traditional techniques for rendering 3D curves often face limitations and challenges with memory and computational efficiency, particularly for high-quality, real-time rendering. These methods can be broadly categorized into non-linear and linear approaches. Non-linear methods, while providing smooth and high-quality curves, generally use custom software rasterizers or intersection programs, making them slower and more complex. Linear methods, which approximate curves using piecewise linear segments, offer better performance and simplicity but at the cost of increased memory usage and potential loss of visual fidelity due to the use of finer sampling to achieve smooth appearances. Some linear curve rendering methods include tessellated polygonal tubes and camera-facing quadrilateral primitives, both of which have limitations in terms of memory usage and the need for per-frame re-orientation when the camera or the curves move.

Systems and methods in accordance with the present disclosure address these issues by introducing DOTS and/or JOTS, a technique that uses triangle primitives (or other geometrical primitives) to represent piecewise linear curve segments. In some embodiments, DOTS and/or JOTS can be constructed by creating two orthogonal quadrilateral primitives (quads) for each linear segment, each quad being made of two triangles and centered on the associated line segment. This can ensure that the curve thickness can be visible from any viewing angle, thereby maintaining the visual fidelity of the curve.

In some embodiments, DOTS and/or JOTS can render static and/or animated hair and fur with increased efficiency compared to existing methods. For static scenes, DOTS and/or JOTS avoid the need for frequent bounding volume hierarchy (BVH) updates, which can be computationally expensive. For animated scenes, DOTS and/or JOTS can provide an alternative solution for hardware-accelerated hair rendering in the absence of newer hardware acceleration technologies (e.g., using line swept spheres (LSS) techniques). By using fewer triangles per curve segment and leveraging existing GPU hardware, DOTS and/or JOTS can achieve high performance while minimizing memory usage.

Additionally, the systems and methods implementing orthogonal triangle strips can include using both disjoint (e.g., DOTS) and joined segments (e.g., JOTS). Disjoint segments can refer to configurations where the vertices of the quads are not shared between two segments, allowing each segment to have a different rotational orientation and reducing orientation restrictions. In contrast, joined segments can refer to sharing vertices between adjacent segments, imposing an orientation restriction that facilitates continuity and alignment. Diagrammatically, this difference can be illustrated by whether the endpoints of the quads intersect at common vertices (joined) or distinct (disjoint).

The shading of DOTS and/or JOTS can also be optimized to improve the visual quality of the rendered curves. Unlike traditional methods that use geometric normals, DOTS and/or JOTS can be used to compute shading normals to obtain an approximation of the appearance of round curves. In some embodiments, calculating the shading normal can be based on an imaginary hit point as if the curve segment were convex and round (e.g., proxy LSS), thereby providing realistic lighting and shading effects. For instance, the shading normal can be computed using a proxy LSS corresponding to and tightly containing (e.g., a bounding cylinder or sphere) the DOTS/JOTS segment. In this example, the proxy LSS can provide a virtual geometry that approximates the cross-segment of the curve as circular. That is, the DOTS and/or JOTS technique can be used in various applications, including gaming, virtual reality, and film production, where high-quality real-time rendering of complex 3D curves can be important. For instance, DOTS and/or JOTS can be used to render detailed hair simulations that facilitate realistic motion and interaction in real-time, improving the visual experience in interactive media and simulations. The systems and methods described herein may also be used to improve visual simulations in architectural visualization, digital marketing, and other fields using detailed and realistic 3D representations. By optimizing the rendering process and leveraging existing hardware, DOTS and/or JOTS can provide an improved technical solution to the challenges of real-time 3D curve rendering.

In some embodiments, DOTS and/or JOTS can be implemented to utilize a radius expansion factor to improve the visual appearance match of other geometric strand primitive types, such as LSS. DOTS and/or JOTS can address the visual differences when viewing the curves from various angles, ensuring that the average width of the DOTS and/or JOTS segment matches the intended radius. Specifically, the radius of the DOTS and/or JOTS segments can be increased by an inflation factor, which can adjust the apparent width to be consistent with that of LSS or other primitives. Shading aspects of DOTS and/or JOTS can include the use of proxy shading normals to give DOTS and/or JOTS segments a round appearance, despite their geometric configuration. In some embodiments, presenting a round appearance can include computing a shading normal as if the segment were a round cylinder, improving the lighting and shading effects to appear more natural.

Additionally, a proxy hit point can be used to cast secondary rays for effects such as shadow visibility, bounce lighting, and/or translucency. The proxy techniques can ensure that the rendered appearance of DOTS and/or JOTS can be consistent with high-quality strand representations, making these features advantageous for practical use of DOTS and/or JOTS in real-time applications. By incorporating these features, DOTS and/or JOTS can provide a technical solution for rendering 3D curve primitives in real-time, balancing performance, memory usage, and visual fidelity.

With reference to FIG. 1, FIG. 1 is an example environment 100 for performing operations on strand-based objects, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. These components interact to facilitate the rendering of three-dimensional (3D) curve primitives with thickness for objects such as hair, fur, grass, and other strand-based objects using DOTS and/or JOTS.

The environment 100 includes a user interface device 102, a display device 104, a computing device 106, and a database 108. In some embodiments, the user interface device 102, the display device 104, the computing device 106, and/or the database 108 can include one or more components that are the same as, or similar to, one or more components of the computing device 700 of FIG. 7. In some embodiments, one or more of the devices of FIG. 1 can interconnect via one or more wired and/or wireless connections, such interconnections corresponding to one or more networks as described herein.

In some embodiments, the user interface device 102 can include one or more devices configured to be in communication with the computing device 106. For instance, the user interface device 102 can include one or more devices configured to be in wired and/or wireless communication with the computing device 106, thereby establishing wired and/or wireless connections with the computing device 106. In some embodiments, the user interface device 102 can transmit data to the computing device 106 via the one or more wired and/or wireless communication connections. In some embodiments, the user interface device can include one or more of: a keyboard, a mouse, a joystick, and/or the like.

In some embodiments, the display device 104 can include one or more devices configured to be in communication with the computing device 106. For instance, the display device 104 can include one or more devices configured to be in wired and/or wireless communication with the computing device 106, thereby establishing wired and/or wireless connections with the computing device 106. In some embodiments, the display device 104 can include a device that can be configured to output one or more videos, images, and/or other scenes (generally referred to as content) generated by the computing device 106. For instance, the display device 104 can include a device such as a computer monitor, a touchscreen, a mobile device display (e.g., a smartphone display), and/or the like. In some embodiments, the display device 104 can be configured to display content generated by the computing device 106. For instance, the display device 104 can receive data from the computing device 106 and outputs visual representations of 3D scenes, including strand-based objects rendered using DOTS and JOTS.

In some embodiments, the computing device 106 can include one or more devices configured to be in communication with the user interface device 102, the display device 104, and/or the database 108. For instance, the computing device 106 can include one or more devices configured to be in wired and/or wireless communication with the user interface device 102, the display device 104, and/or the database 108, thereby establishing wired and/or wireless communication connections with the computing device 106. In some embodiments, the computing device 106 can include a device that can be configured to generate data associated with content, the data associated with content configured to cause the display device 104 to display the content. For instance, the computing device 106 can include a device such as a mobile device (e.g., smartphone), a laptop, a desktop, a server, and/or the like. Generally, the computing device 106 can generate data associated with content, which include the rendering of strand-based objects like hair, fur, and grass. In some embodiments, the computing device 106 can utilize triangle rendering hardware (e.g., NVIDIA RTX) to implement DOTS and JOTS techniques.

In some embodiments, the database 108 can include one or more devices configured to be in communication with the computing device 106. For instance, the database 108 can include one or more devices configured to be in wired and/or wireless communication with the computing device 106, thereby establishing wired and/or wireless communication connections with the computing device 106. In some embodiments, the database 108 can include a device that can be configured to store data described herein such as, for instance, data associated with strand-based objects, other objects, data associated with content, and/or the like. For instance, the database 108 can include a device such as a memory as described herein. In some embodiments, the data stored in database 108 can include information about the 3D scene, such as the position and properties of strand-based objects. The database 108 can be accessed by the computing device 106 via wired or wireless connections to retrieve and store scene data.

Referring generally to DOTS and JOTS, these techniques represent an improved technical solution to rendering strand-based objects in three-dimensional (3D) environments. Oftentimes, the primary challenge in rendering such objects occurs in balancing computational efficiency and visual fidelity. DOTS and JOTS address this challenge by leveraging existing hardware for triangle rendering, such as NVIDIA RTX architectures. These techniques can be implemented by the computing device 106 using a series of triangle primitives (or other geometrical primitives, such as polygons) to obtain an approximation of the curves, reducing the memory and computational resources required compared to traditional methods. The integration of DOTS and JOTS within the rendering pipeline allows for real-time performance without reducing visual quality.

DOTS is a technique to represent curves using a sequence of connected triangles (e.g., where each pair of triangles forms a quad). In DOTS, the quads are not connected to each other (e.g., the quads are disjointed—there is no sharing of vertices between the quads of adjacent segments). In some embodiments, the use of DOTS allows for each segment to be independently oriented, reducing the computational complexity when the orientation changes. Additionally, JOTS is also a technique to represent curves using a sequence of connected triangles, where each pair of triangles forms a quad. However, unlike in DOTS, the quads using JOTS can be connected to each other. That is, the vertices of the quads can be shared between adjacent segments, forming a continuous strip.

As used herein, a "quad" can refer to any polygon used in the rendering process (e.g., four-sided polygon, such as rectangles, trapezoids, and/or parallelograms). Also, as used herein, "linear segments" can refer to the straight-line portions of a curve (e.g., sections of a piecewise linear representation) that can be used for rendering strand-based objects. Further, as used herein, a "strand-based object" can refer to any object composed of elongated, thin elements (e.g., wireframe rendering, 3D path rendering, 3D font rendering, 3D line drawings, carpet, lint, and/or cables). Additionally, while triangle primitives can be described and used herein, other polygonal primitives (e.g., quadrilaterals, hexagons) can also be employed in the rendering process. For instance, different shapes can be utilized depending on the specific requirements of the rendering system (e.g., to optimize for performance and/or visual fidelity). Thus, the techniques described herein are not limited to triangles and can be adapted to various geometric primitives to achieve the desired visual effects.

With continued reference to FIG. 1, the computing device 106 can approximate a curve having a plurality of linear segments. The computing device 106 can determine a set of vertices and edges that define the linear segments. The set of vertices and edges can then be mapped onto triangle primitives to create quads. The computing device 106 can then store the linear segments in a memory for subsequent processing and rendering. Additionally, the computing device 106 can adjust the level of detail of the curve approximation based on factors such as the distance from the camera and/or the complexity of the scene.

In some embodiments, the computing device 106 can determine two quads for each of the plurality of linear segments using a plurality of triangle primitives. For instance, each of the two quads can include two of the plurality of triangle primitives. Additionally, the two quads can extend along a corresponding linear segments of the plurality of linear segments and the two quads can be angled relative to one another. That is, the same linear segment of the plurality of linear segments can extend along the same direction as the corresponding linear segment. The computing device 106 can calculate the positions and orientations of these quads based on the vertices of the linear segments. In some embodiments, the computing device 106 can utilize DOTS and/or JOTS to improve the rendering of strand-based objects. The computing device 106 can determine whether to use DOTS and/or JOTS based on factors such as the desired visual quality and performance requirements. In some embodiments, the computing device 106 can dynamically switch between DOTS and JOTS during rendering to optimize the balance between visual fidelity and computational efficiency.

In some embodiments, DOTS and JOTS can be constructed by the computing device 106 creating orthogonal quads for each linear segment, each quad being made of two triangles. The quads can be centered on the associated line segment, facilitating the visibility of the curve thickness from any viewing angle. The use of DOTS and JOTS can avoid and/or reduce the need for frequent updates to the bounding volume hierarchy (BVH), which can be computationally expensive. By minimizing BVH updates, the computing device 106 can provide smoother and more efficient real-time rendering.

In static scenes, DOTS and JOTS minimize the need for BVH updates. The computing device 106 can manage static and dynamic data. In some embodiments, the database 108 can store static scene data, which the computing device 106 accesses. In animated scenes, the DOTS and JOTS techniques provide hardware-accelerated rendering for strand-based objects without relying on newer hardware acceleration technologies. The computing device 106 can process animation data, updating the rendering in real time to reflect changes in the scene. By using fewer triangles per curve segment and leveraging existing GPU hardware, DOTS and JOTS can be used to achieve high performance while minimizing memory usage. The user interface device 102 can facilitate user interactions with the animated scenes, making adjustments and viewing the results in real-time.

In some embodiments, the computing device 106 can shade the two quads for each of the plurality of linear segments. For instance, the computing device 106 can compute shading normals for each quad based on the vertices and edges of the linear segments. The shading normals can be used to calculate the lighting and shading effects for each quad. In some embodiments, the computing device 106 can utilize proxy shading normals to simulate the appearance of round curves. The computing device 106 can calculate the proxy shading normals based on the positions and orientations of the linear segments.

In some embodiments, the computing device 106 can shade the two quads for each of the plurality of linear segments using a proxy infinite cone and a proxy LSS. For instance, the computing device 106 can compute proxy shading normals for each quad by re-intersecting the ray with the proxy infinite cone that contains the DOTS/JOTS segment. The proxy shading normals can be used to calculate the lighting and shading effects for each quad. In some embodiments, the computing device 106 can utilize the proxy LSS to simulate the appearance of round curves. The computing device 106 can calculate the proxy hit points, such as the fixed reflection hit position and the fixed transmission hit position, based on the positions and orientations of the linear segments.

With continued reference to FIG. 1, the computing device 106 can obtain an approximation (or perform a calculation) of the shading normals by re-intersecting the ray with a proxy infinite cone that contains the DOTS/JOTS segment. The approximation can be of a 3D curve having a plurality of linear segments. The proxy infinite cone can also contain the associated proxy LSS corresponding to the DOTS/JOTS segment. That is, the computing device 106 can perform the ray-cone intersection without requiring the ray to traverse the entire scene. In some embodiments, this can be achieved by computing the intersection with the specific cone corresponding to a DOTS/JOTS segment directly (e.g., particular linear segment). In some embodiments, the computing device 106 can also compute a proxy hit point using the proxy LSS, which can include spherical endcaps. The proxy hit point can be used when the computing device 106 sends secondary rays for effects such as reflections, refractions, or shadows. The proxy hit point can facilitate the simulation of the appearance of strand-based objects with higher visual accuracy. That is, by using a combination of proxy hit points with proxy LSS and proxy normals with a proxy infinite cone, the computing device 106 can match the appearance of scenes composed of LSS primitives. The implementation and approximation of normals using the proxy infinite cones is described in greater detail below with reference to FIG. 5G.

In some embodiments, the use of DOTS and JOTS by the computing device 106 can improve visual quality. That is, unlike traditional methods that use geometric normals, the computing device 106 can compute shading normals to approximate the appearance of round curves. The computing device 106 can perform the shading calculations based on imaginary hit points, as if the curve segment were convex and round, providing realistic lighting and shading effects. In some embodiments, the display device 104 can present the high-quality content (e.g., images, videos, etc.). Specifically, the computing device 106 can utilize a proxy hit point to cast secondary rays for effects such as shadow visibility, bounce lighting, and/or translucency. The computing device 106 can calculate the proxy hit point based on the positions and orientations of the linear segments. For instance, the proxy hit point can be used to determine the intersection points of the secondary rays with the rendered objects.

In some embodiments, the computing device 106 can utilize (e.g., apply) a radius expansion factor to update the visual appearance of the rendered curves. For instance, the computing device 106 can calculate the radius expansion factor based on one or more desired visual properties of the strand-based objects, such as thickness or smoothness. The computing device 106 can then apply the radius expansion factor to the vertices of the linear segments to obtain the appropriate visual properties. That is, the computing device 106 can utilize a radius expansion factor to match the visual appearance of other geometric strand primitive types. For instance, the use of the radius expansion factor can ensure that the average width of the DOTS and JOTS segments matches the intended radius from various viewing angles. The computing device 106 can perform these adjustments dynamically.

In some embodiments, the computing device 106 can dynamically adjust the rendering process based on the specific requirements of the scene. For instance, the computing device 106 can analyze the scene data and determine the rendering parameters, such as the level of detail or the rendering (e.g., shading) techniques to be used. The computing device 106 can then adjust the rendering process accordingly. In some embodiments, the computing device 106 can store the rendered images in a memory for subsequent processing and display. The computing device 106 can also transmit the rendered images to other devices, such as the user interface device 102 and/or the display device 104, for display to the user. Additionally, the user interface device 102 and display device 104 can facilitate interaction with the 3D scene, allowing users to manipulate and view high-fidelity strand-based objects in real time. In some embodiments, the database 108 stores data that the computing device 106 can retrieve and process. Additional details related to the rendering of 3D curve primitives are described below with reference to FIGS. 2, 3, 4A-4C, and 5A-5F.

Figure 2:
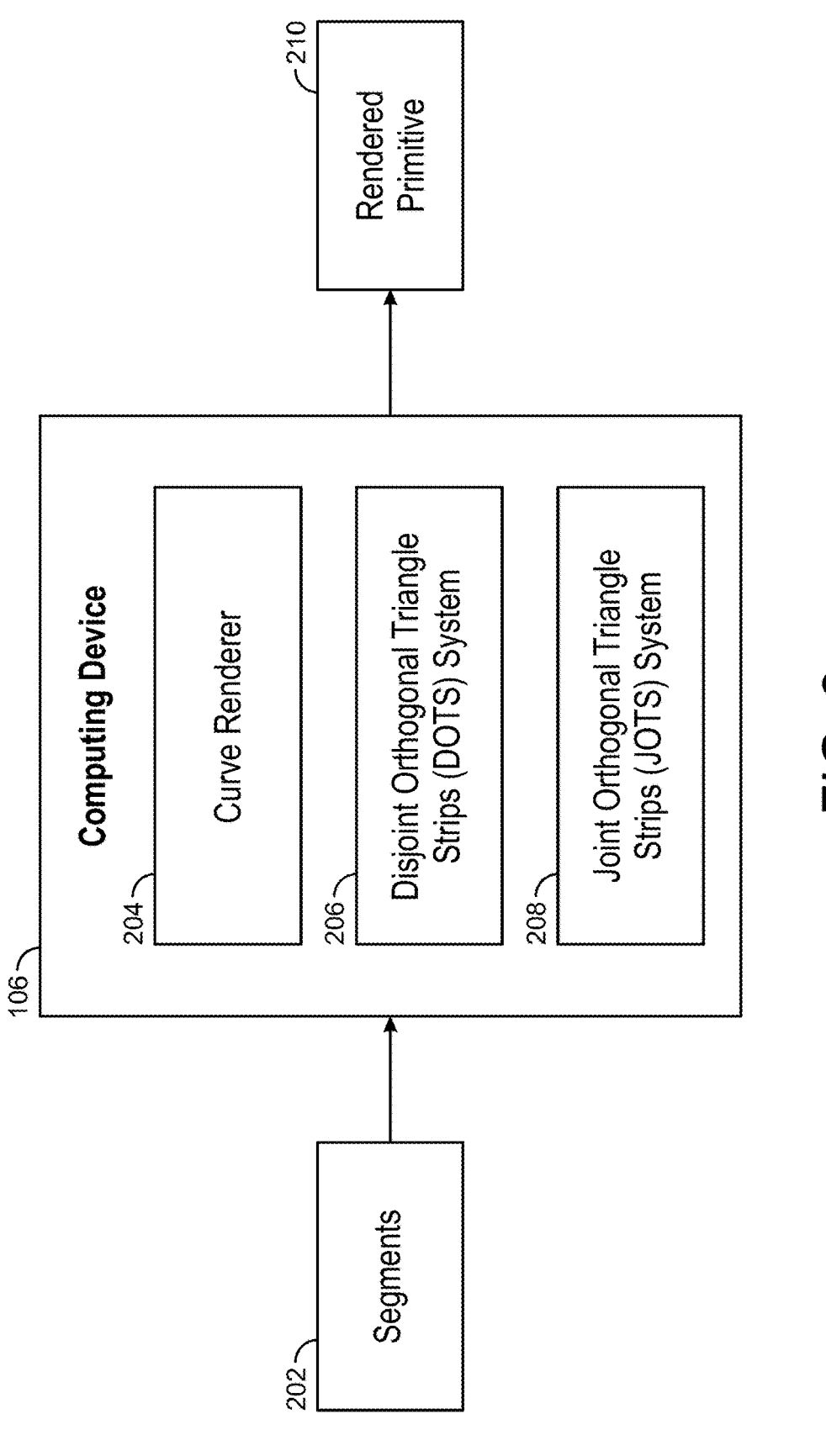
FIG. 2 depicts a block diagram of an example system to render strand-based objects, in accordance with some embodiments of the present disclosure.

Now referring to FIG. 2, a block diagram of an example system 200 to render strand-based objects, in accordance with some embodiments of the present disclosure. In some embodiments, the segments 202 can represent the linear portions of the curves that the system 200 processes for rendering. For instance, the segments 202 can be input into the computing device 106, where they are processed by the DOTS system 206 and/or JOTS system 208. The segments 202 can include information such as vertex positions, segment lengths, and orientations. That is, the segments 202 can vary in length and orientation, allowing for the representation of strand-based objects such as wireframe rendering, 3D path rendering, 3D font rendering, 3D line drawings, carpet, lint, and/or cables. For instance, as the viewing angle and/or lighting conditions change, the computing device 106 can reprocess the segments 202 to maintain visual fidelity. Additionally, the curve renderer 204 of the computing device 106 can use these segments to construct the final visual representation of the objects (e.g., rendered primitive 210).

Referring to the computing device 106 in greater detail, the computing device 106 can include or be coupled with at least one curve renderer, such as the curve renderer 204. The curve renderer 204 can render the shaded quads for each of the plurality of linear segments. In some embodiments, the curve renderer 204 can perform final rendering by generating the rendered primitive 210 using the shaded quads provided by the DOTS system 206 and/or the JOTS system 208. That is, the curve renderer 204 can use the shaded quads by applying the pre-calculated shading normals to simulate lighting interactions. For instance, the curve renderer 204 can use these shaded quads, which can be composed of triangle primitives, to calculate the final pixel colors for the rendered image. That is, the shaded quads represent approximations of the strand-based curves and can be used as the basis for rendering the detailed appearance of the objects. For instance, the curve renderer 204 can utilize the geometry of the triangle primitives to ensure accurate shading and lighting effects. In some embodiments, the curve renderer 204 can apply various post-processing techniques to enhance the visual quality of the rendered primitive 210.

Additionally, the curve renderer 204 can include a shader (also referred to as a "shader system") configured to perform the shading operations for the plurality of linear segments. The shader can compute the lighting interactions for each of the shaded quads based on the pre-calculated shading normals provided by the DOTS system 206 and/or the JOTS system 208. That is, the shader can use these shading normals to simulate realistic lighting effects on the strand-based objects. For instance, the shader can calculate the diffuse and specular components of the lighting to achieve high-fidelity rendering. The shader can process each quad by determining how light rays interact with the triangle primitives that compose the quads, thereby generating the appropriate shading for each segment. That is, the shader can use the shading information to create a smooth transition between the quads, maintaining visual consistency along the curve. For instance, the shader can dynamically adjust the shading based on changes in the viewing angle, light source positions, or other scene parameters to ensure the rendered primitive 210 reflects realistic lighting and shadow effects. In some embodiments, the shader in the curve renderer 204 can execute a series of instructions on the computing device 106 to perform shading computations for each of the plurality of linear segments using the shading normals provided by the DOTS system 206 and/or the JOTS system 208. That is, the shader can apply these instructions to compute lighting effects on the triangle primitives composing each quad, utilizing the processing circuits. For instance, the shader can process each quad by executing instructions to calculate diffuse and specular lighting interactions based on the light direction and surface properties.

In some embodiments, the curve renderer 204 can use ray tracing or any other suitable light transport simulation technique to generate the rendered primitive 210 from the shaded quads provided by the DOTS system 206 and/or the JOTS system 208. Ray tracing can be used by the curve renderer 204 to trace the path of light rays as they interact with the triangle primitives of the quads and other objects in the scene. For instance, the curve renderer 204 can calculate the intersections of light rays with the quads, determining the resulting absorption, reflection, and/or refraction. That is, the curve renderer 204 can output realistic lighting effects, such as accurate shadows, depth of field, and global illumination. Additionally, the curve renderer 204 can employ hardware acceleration, such as NVIDIA RTX, to perform ray tracing in real-time, leveraging the shaded quads of linear segments from the DOTS and JOTS systems 206 and 208 to achieve realistic results.

The computing device 106 can also include or be coupled with at least one DOTS system, such as the DOTS system 206. The DOTS system 206 can obtain an approximation of a three-dimensional (3D) curve including a plurality of linear segments. For instance, the DOTS system 206 can determine a set of vertices and edges that define the linear segments. That is, the DOTS system 206 can create an accurate representation of the curve. In some embodiments, the DOTS system 206 can use these vertices and edges to construct the curve. For instance, the curve can be a piecewise linear curve, a spline curve, and/or a polygonal chain. In another instance, the DOTS system 206 can store the approximated curves in a memory for further processing. In some embodiments, the DOTS system 206 can generate an initial approximation of the curve by sampling points along its length. For instance, the DOTS system 206 can refine this approximation iteratively to improve accuracy.

In some embodiments, two quads can be used to create a visual representation of a linear segment. The two quads can have an intersection in space with a locus that can be the 3D line of the linear segment. That is, the quads intersect along the line representing the segment's central axis. In some embodiments, the quads can be planar such that they maintain a flat surface orientation. For instance, in DOTS, the quads can be rectangular. That is, each quad can have equal-length sides perpendicular to the segment's axis. In another instance, in JOTS, the quads may be trapezoidal. That is, the quads can have varying side lengths to accommodate joint segments.

In some embodiments, the DOTS system 206 can also determine two quads for each of the plurality of linear segments using a plurality of triangle primitives. For instance, each of the two quads can include two of the plurality of triangle primitives. Additionally, the two quads can extend along a corresponding linear segment (also referred to as a "particular linear segment") and can be angled relative to one another. Furthermore, the at least two quads corresponding to the same linear segment of the plurality of linear segments can extend along the same direction as the corresponding linear segment and can be angled relative to one another. For instance, the DOTS system 206 can calculate the positions and orientations of these quads based on the vertices of the linear segments. That is, the DOTS system 206 can align the quads to maintain visual consistency from different viewing angles (e.g., top-down, side, isometric). In some embodiments, the DOTS system 206 can dynamically adjust the angle of the quads. That is, the DOTS system 206 can reconfigure the quads in real-time based on changes in the scene. For instance, when the viewing angle changes and/or when the objects move within the scene.

In some embodiments, the DOTS system 206 can also shade the two quads for each of the plurality of linear segments. For instance, the DOTS system 206 can compute shading normals for each quad based on the vertices and edges of the linear segments. That is, the DOTS system 206 can calculate the lighting and shading effects for each quad to represent the appearance of the strand-based objects accurately. For instance, the DOTS system 206 can calculate the lighting and shading effects by determining the angle of incident light on each quad and adjusting the shading accordingly. Additionally, the DOTS system 206 can provide the shaded quads to the curve renderer 204 for rendering. That is, the DOTS system 206 processes the segments 202 and outputs the shaded quads for final rendering by the curve renderer 204.

The computing device 106 can also include or be coupled with at least one JOTS system, such as the JOTS system 208. Similar to DOTS system 206, the JOTS system 208 can obtain an approximation a of a 3D curve having a plurality of linear segments. For instance, the JOTS system 208 can determine a set of vertices and edges that define the linear segments. That is, the JOTS system 208 can ensure continuity between the segments by joining adjacent segments at their vertices. In some embodiments, the JOTS system 208 can dynamically adjust the quads to maintain smooth transitions between segments. For instance, the JOTS system 208 can calculate the positioning of the quads based on the curvature and orientation of the segments. That is, to join adjacent segments, the JOTS system 208 can adjust the vertices of the quads so that the end vertices of one segment align with the start vertices of the next segment. For instance, a position (e.g., vertex v1) of quad A of segment X can be adjusted to match the position (e.g., corresponding vertex v1) of quad B of segment Y at their shared vertex, ensuring the angles between the quads can be consistent with the path of the curve. In this instance, the JOTS system 208 can determine multiple vertex positions and recalibrate the angles between quads while maintaining the geometric consistency and visual fidelity of the rendered curve. In some embodiments, the recalibration can include calculating the exact positions (e.g., p1, p2, etc.) and orientations (e.g., angles $\theta 1$, $\theta 2$) to align each vertex and angle.

In some embodiments, the JOTS system 208 can also shade the two quads for each of the plurality of linear segments. For instance, the JOTS system 208 can compute shading normals for each quad based on the vertices and edges of the linear segments. That is, the JOTS system 208 can calculate the lighting and shading effects for each quad to represent the appearance of the strand-based objects accurately. For instance, the lighting and shading effects can be calculated by determining the interaction of light with the shading normals derived from the vertices of the quads. Unlike the DOTS system 206, the JOTS system 208 can compute continuous normals across joint segments to maintain consistent shading. For instance, the JOTS system 208 can calculate normals that smoothly blend between segments. Additionally, the JOTS system 208 can provide the shaded quads to the curve renderer 204 for rendering. That is, the JOTS system 208 processes the segments 202 and outputs the shaded quads for final rendering by the curve renderer 204.

In some embodiments, the JOTS system 208 can tessellate the curve using the plurality of piecewise linear curve segments (e.g., to join each curve vertex, where the orthogonal triangle strips can be tessellated to be joined at each curve vertex). In some embodiments, to join each curve vertex, JOTS system 208 may determine and/or compute a moving frame along the curve.

In some embodiments, the plurality of linear segments can include a first linear segment and a second linear segment connected to the first linear segment. For instance, during approximation, the DOTS system 206 and/or JOTS system 208 can break down the curve into smaller segments to facilitate processing and rendering. Additionally, the curve can include a piecewise linear curve including the plurality of linear segments. That is, the piecewise linear curve can approximate curves with linear segments for processing. For instance, each piecewise linear segment can be defined by its endpoints. For instance, using DOTS, the two quads for the first linear segment and the two quads for the second linear segment can be disjointed. That is, the vertices of the quads are not shared, resulting in a convex gap at the connection point between segments (e.g., shown in FIG. 4B). The non-shared vertices relax orientation restrictions when rendering various curves, thereby providing more flexibility in positioning and aligning the quads. This can accommodate changes in viewing angles and lighting conditions, improving the visual fidelity of the rendered objects. In some embodiments, the convex gap can be represented as a small angular separation between the end of one quad and the start of the next, maintaining distinct boundaries for each segment. In another instance, using JOTS, the two quads for the first linear segment and at least one of the two quads for the second linear segment can form a joint (e.g., are jointed). That is, the quads share vertices to facilitate continuity and alignment between segments (e.g., shown in FIG. 4C). Thus, the shared vertices can impose an orientation restriction.

In some embodiments, when DOTS system 206 and/or JOTS system 208 determine two quads, the DOTS system 206 and/or JOTS system 208 can position each of the two quads on a corresponding linear segment of the plurality of linear segments. That is, each quad can be aligned based on the vertices of the corresponding linear segment to maintain visual fidelity. Each quad can include two primitive triangles. In some embodiments, each of two quads can span the corresponding linear segment. For instance, the quads can extend along the entire length of a particular segment. Additionally, the at least two quads corresponding to the same linear segment of the plurality of linear segments can extend along the same direction (e.g., along the axis defined by the vertices of the linear segment) as the corresponding linear segment and can be angled relative to one another (e.g., to maintain a consistent thickness and alignment with the overall direction of the curve). For instance, the two quads can be positioned such that they overlap along the length of the linear segment. In some embodiments, each of the plurality of linear segments can be defined by two vertices, and the two vertices can be on each quad of the two quads (corresponding to particular segments). That is, the two vertices can define midpoints of parallel edges defining each quad of the two quads. For instance, the vertices can be positioned to present an accurate representation of the strand-based object.

In some embodiments, the two quads can have a length that can be the same as a length the corresponding linear segment. For instance, the length of each quad can match the length of the corresponding segment. Additionally, the approximated curve can correspond to a structure that can include a varying radius. For instance, each quad can have a plurality of widths such that a width can increase or decrease from a first vertex (e.g., one end of the quad) to a second vertex (e.g., another end of the quad). As the width increases or decreases, the approximated curve can represent a structure that changes in thickness. That is, the varying radius in the structure (having a plurality of linear segments with, e.g., varying widths) can be used to represent the changing thickness of the strand-based objects. For instance, each of the two quads has a first width (w0) at a first vertex of the corresponding linear segment of the plurality of linear segments and a second width (w1) at a second vertex of the corresponding linear segment of the plurality of linear segments. That is, the width (or radius of a structure approximated by the curve) can change along the length of the segment to represent tapering and/or thickening.

In some embodiments, each of the two quads can have a width that can be the equivalent to a diameter of a corresponding linear segment of the plurality of linear segments. That is, the width of each quad can match the diameter of the corresponding segment. For instance, the quads can be centered along the width of their corresponding segments. Additionally, each of the two quads can be centered along the width of its corresponding linear segment of the plurality of linear segments. That is, the quads can be positioned to maintain visual fidelity across the entire length of the segment. For instance, the alignment can maintain a consistent representation of the strand-based objects.

In some embodiments, the two quads can be transverse relative to one another. That is, the quads can be oriented at right angles to each other. Additionally, the two vertices on each of the two quads (e.g., parallel edges defining each quad of the two quads) can intersect at an angle to form a cross-sectional view traversing along each of the plurality of linear segments. The two vertices can define midpoints of parallel edges defining each quad. For instance, the intersection can provide a consistent visual appearance. In some embodiments, the two quads can be orthogonal to one another. Additionally, the two vertices of the two quads can be at least one of (i) shared between one or more adjacent linear segments of the plurality of linear segments or (ii) independently positioned for each of the plurality of linear segments. That is, sharing vertices can include merging vertices at the intersection points to maintain continuity, while independently positioning vertices can include placing vertices at specific locations for each segment. For instance, sharing can reduce the number of triangles required for rendering. In another instance, independently positioned vertices can facilitate the accurate representation of each segment.

In some embodiments, when DOTS system 206 and/or JOTS system 208 shade the two quads, the DOTS system 206 and/or JOTS system 208 can shade the curve using a plurality of proxy shading normals corresponding to a plurality of hit points (e.g., ray intersections) to obtain an approximation that approximates an appearance of convex curve segments or round curve segments. That is, the two quads can be shaded by calculating a plurality of proxy shading normals using a proxy infinite cone, corresponding to a plurality of hit points, to approximate an appearance of convex curve segments or round curve segments. For instance, the DOTS system 206 and/or JOTS system 208 can compute shading normals to simulate the appearance of round curves. In some embodiments, a proxy shading normal can be calculated based on the virtual geometry of the curve (e.g., cylindrical model). For instance, the proxy shading normal can approximate the appearance of a cylindrical segment. That is, the hit points can be used to determine the intersection points of the shading normals with the rendered objects. For instance, the shading normals can provide realistic lighting and shading effects for the strand-based objects. Thus, the DOTS system 206 and/or JOTS system 208 can employ proxy shading normals to give orthogonal triangle strips a round appearance, simulating the look of cylindrical strand primitives. For instance, the DOTS system 206 and/or JOTS system 208 can calculate the shaded normals based on the virtual geometry of the curve. Furthermore, the use of a proxy hit point can be used by the DOTS system 206 and/or JOTS system 208 to cast secondary rays for effects such as shadow visibility, bounce lighting, and/or translucency, adding depth and complexity to the final image.

In some embodiments, when DOTS system 206 and/or JOTS system 208 shade the two quads, the DOTS system 206 and/or JOTS system 208 can apply a radius expansion factor to the plurality of linear segments to match an average width of the plurality of linear segments to an intended radius from a plurality of viewing angles. That is, the radius expansion factor can be used to improve the visual consistency of the orthogonal triangle strips (OTS) (including both DOTS and JOTS) with other geometric strand primitive types. By adjusting the radius expansion factor, the DOTS system 206 and/or JOTS system 208 can verify the average width of the OTS segments matches the intended radius, thereby providing a more uniform appearance across different rendering methods.

For instance, the average width can be 0.5 units (e.g., when viewed from a side angle), whereas the intended radius can be 1.0 unit. In this instance, the intended radius can determine the thickness of the strand-based objects, and the average width can be adjusted to meet this target dimension (e.g., when viewed head-on). In some embodiments, the radius expansion factor can be calculated based on the desired visual properties (e.g., thickness, smoothness, curvature) of the strand-based objects. In some embodiments, the radius expansion factor can be applied dynamically based on the current viewing angle. For instance, the viewing angles can be 30 degrees, 45 degrees, and 60 degrees. In these instances, when the viewing angle is 30 degrees, the radius expansion factor can be 1.2 since the object appears narrower. However, when the viewing angle is 60 degrees, the radius expansion factor can be 0.8 since the object appears wider.

Figure 3:
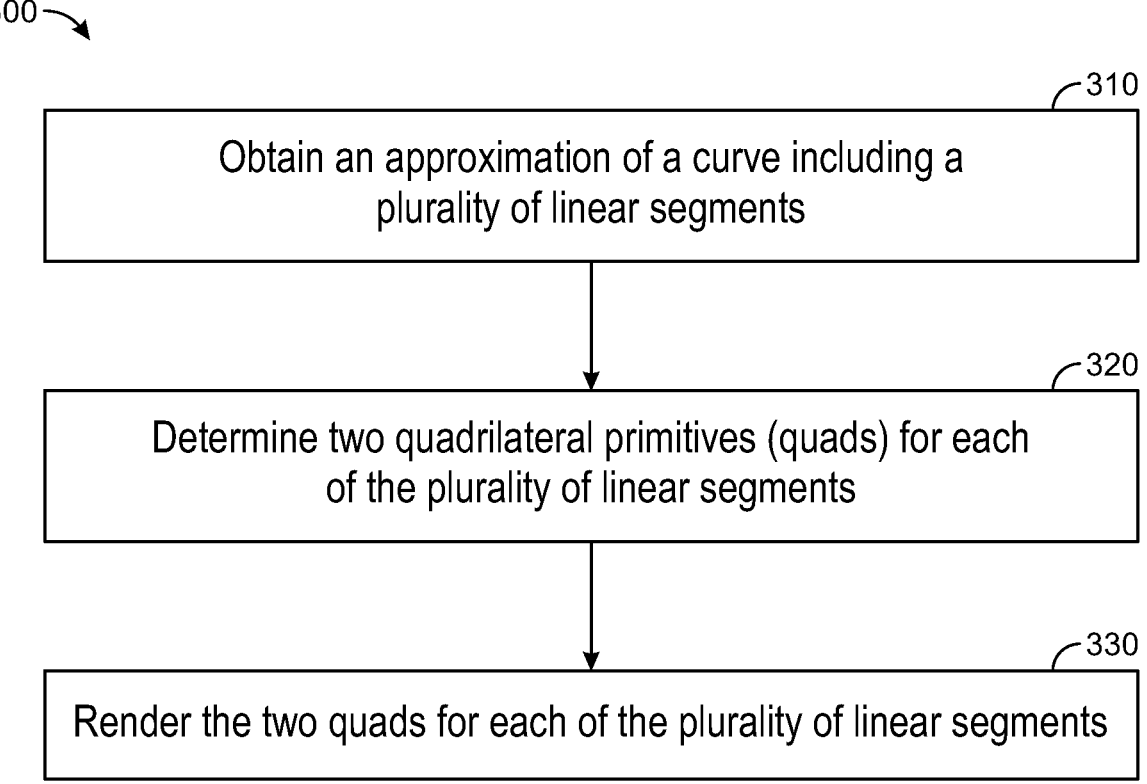
FIG. 3 is a flow diagram of an example of a method for rendering 3D curve primitives using DOTS and/or JOTS, in accordance with some embodiments of the present disclosure.

Now referring to FIG. 3, a flow diagram showing a method 300 for rendering 3D curve primitives using DOTS and/or JOTS, in accordance with some embodiments of the present disclosure. Various operations of the method 300 can be implemented by the same or different devices or entities at various points in time. For instance, one or more first devices can implement operations relating to obtaining approximations and segmentations of curves, while one or more second devices can implement operations relating to the rendering of quads.

Each block of method 300, described herein, includes a computing process that can be performed using any combination of hardware, firmware, and/or software. For instance, various functions can be carried out by a processor executing instructions stored in memory. The method can also be embodied as computer-usable instructions stored on computer storage media. The method can be provided by a standalone application, a service or hosted service (standalone or in combination with another hosted service), or a plug-in to another product, to name a few. In addition, method 300 is described, by way of example, with respect to the systems and architectures of FIG. 1 and FIG. 2. However, this method can additionally or alternatively be executed by any one system, or any combination of systems, including, but not limited to, those described herein. For instance, in some embodiments, the systems and methods described herein may be implemented using one or more application servers and client devices (e.g., as described in FIG. 6), one or more computing devices (e.g., as described in FIG. 7), and/or one or more data centers (e.g., as described in FIG. 8).

Various operations of method 300 can relate to the rendering and optimization of 3D curve primitives. Existing systems often are inefficient in generating high-quality curve renderings that maintain visual fidelity across multiple angles and lighting conditions. The existing technological problems can arise when attempting to achieve consistent and accurate representation of strand-based objects in real-time rendering. Method 300 and the systems and architectures of FIG. 1 and FIG. 2 can solve the technological problems by employing a technical solution by performing curve approximation using DOTS and/or JOTS, dynamic adjusting quads, and iterative shading (e.g., rendering) techniques. This method enhances the rendering process by segmenting curves into linear segments, applying proxy shading normals, and ensuring visual consistency across different viewing angles through radius expansion factors and real-time recalibration.

The method 300, at block 310, includes obtaining an approximation of a 3D curve. The approximated curve can include a plurality of linear segments. The obtaining can be one or more operations of the processors. For instance, one or more processing circuits can divide the curve into smaller linear segments, which approximate the overall shape of the curve. That is, the processing circuits can segment the curve into straight-line segments defined by their endpoints (vertices). For instance, the curve can be segmented based on the curvature and length of each part of the original curve. In some embodiments, the curve can be segments of strand-based objects (e.g., hair, fur, grass, wireframe rendering, 3D path rendering, 3D font rendering, 3D line drawings, carpet, lint, and/or cables) received from a simulation and/or model. That is, instead of using textures, the strand-based objects can be represented with linear segments for more simulation and rendering. For instance, each segment can represent a portion of the strand with specific start and end points. In some embodiments, the curve can be a piecewise linear curve including the plurality of linear segments. For instance, each linear segment can be processed individually and then combined to form the overall curve. In some embodiments, the plurality of linear segments can include a first linear segment and a second linear segment connected to the first linear segment. That is, each segment can be connected end-to-end to form a continuous approximation of the original.

In some embodiments, creating linear segments can include detecting the overall shape of the curve (e.g., analyzing the global geometry) and/or calculating curvature at multiple points (e.g., using differential geometry techniques). In some embodiments, creating linear segments can also include identifying inflection points (e.g., identifying points where the curvature changes sign), determining segment start and end points (e.g., defining vertices at key positions), and/or optimizing segment lengths to balance accuracy and computational efficiency (e.g., adjusting segment sizes based on curvature). That is, the creation of linear segments when the curve can be approximated can be implemented by one or more algorithms and/or models (e.g., spline interpolation, polynomial fitting, machine learning models, and/or any geometric analysis tool) that analyze the curve's geometry, divide it into segments, and dynamically adjust these segments based on real-time data and rendering requirements.

In some embodiments, obtaining the approximation of the 3D curve can include dynamically determining the segment length (e.g., based on the object's overall size and required detail) and/or density (e.g., the number of segments—higher density for more detailed representations, lower density for simpler representations). For instance, when approximating grass in a video game, the processing circuits can divide each blade of grass into segments of 1-2 cm in length. If a blade of grass is 10 cm long, the grass can be divided into 5-10 segments, each with a start and end point that aligns with the curvature of the grass. In some embodiments, the processing circuits can determine these segments based on the grass model and its position within the game environment. In another instance, when approximating a human hair in a film, the strands can be divided into segments of 0.5-1 mm to capture the finer details of the hair's natural flow and movement. A strand of hair that is 50 cm long can be divided into 500-1000 segments. In some embodiments, each segment can be processed to ensure that the hair appears smooth and realistic when rendered. That is, the higher segment density in the film instance can allows for more detailed and lifelike animations. Thus, the processing circuits can dynamically adjust the segment length and density based on the specific requirements of the application.

The method 300, at block 320, includes determining two quadrilateral primitives (quads) for each of the plurality of linear segments using a plurality of triangle primitives. The determining can be one or more operations of the processors. Additionally, the two quads corresponding to each linear segment (e.g., particular linear segments) of the plurality of linear segments can be angled relative to one another and extend along the corresponding linear segment. That is, one or more processing circuits can implement DOTS geometric configurations or JOTS geometric configurations where the quads can be arranged based on the specified configurations. In some embodiments, each of the two quads can include two of the plurality of triangle primitives. Additionally, the two quads can extend along the same direction as the corresponding segment of the plurality of linear segments and the two quads can be angled relative to one another. In some embodiments, each of the two quads can be positioned on a corresponding linear segment of the plurality of linear segments. For instance, the quads can be placed such that they encompass the entire segment length. In some embodiments, each of the two quads can span a corresponding linear segment of the plurality of linear segments. That is, the quads can be aligned to cover the segment completely. For instance, the quads can be positioned end-to-end. In some embodiments, each of the plurality of linear segments can be defined by two vertices (e.g., defining midpoints of parallel edges), and the two vertices can be on each of the two quads. That is, the vertices act as the connection points for the quads. For instance, the vertices can be at the start and end of each segment.

In some embodiments, the quads can be composed of triangle strips (TS) and/or other polygon strips. In some embodiments, the two quads can be orthogonal (O) to each other. Additionally, for DOTS, the segments composed of the quads can be disjointed (D). Alternatively, for JOTS, the segments composed of the quads can form a joint (J). That is, the two vertices can be at least one of (i) shared between one or more adjacent linear segments of the plurality of linear segments (e.g., JOTS geometric configurations) or (ii) independently positioned for each of the plurality of linear segments (e.g., DOTS geometric configurations). In some embodiments, the two quads can be transverse to one another. Additionally, the parallel edges defining each quad of the two quads can intersect at an angle to form a cross-sectional view transversing along each of the plurality of linear segments.

In some embodiments, each of the two quads can have a length that can be the same as a length of each of the plurality of linear segments. Additionally, in some embodiments, one or more the plurality of linear segments includes a varying radius. That is, each of the two quads has a first width (w0) at a first vertex of the corresponding linear segment of the plurality of linear segments and a second width (w1) at a second vertex of the corresponding linear segment of the plurality of linear segments. For instance, w0 and w1 can be equal when a segment maintains a consistent width. In another instance, w0 and w1 can be unequal when the segment tapers or expands (e.g., varying radius).

In some embodiments, each of the two quads can have a width that can be the equivalent to a diameter of a corresponding linear segment of the plurality of linear segments. For instance, the width of the quads can match the intended visual thickness of the segments. In some embodiments, each of the two quads can be centered along the width of its corresponding linear segment of the plurality of linear segments. For instance, the quads can be centered to provide uniform appearance from different angles. In some embodiments, the two quads for the first linear segment and the two quads for the second linear segment are disjointed (e.g., DOTS geometric configurations). For instance, the quads do not share vertices, resulting in a distinct separation. In some embodiments, the two quads for the first linear segment and the two quads for the second linear segment are joined (collectively form a joint) (e.g., JOTS geometric configurations). For instance, the quads share vertices at their endpoints, creating a continuous transition.

Referring generally to bounding volume hierarchy (BVH), BVH can be a tree structure used the processing circuits to accelerate the process of ray tracing in 3D graphics by hierarchically partitioning space. In the context of DOTS and JOTS, BVHs can be implemented in two main ways: triangle-based BVHs and axis-aligned bounding box (AABB)-based BVHs. Triangle-based BVHs can be fast for base-level tracing but often requires adjustments when processing primitives. AABB-based BVHs can include random boxes attached to shaders that calculate intersections. For DOTS and JOTS, the use of a BVH optimizes the rendering of strand-based objects by minimizing the computational overhead involved in tracing rays through complex scenes. That is, using orthogonal (O) triangle strips (TS) in DOTS can reduce the computational overhead related to orienting the quads and rebuilding the BVH at runtime when the camera moves but the strand-based object remains static. Orthogonal triangle strips (OTS) can maintain a consistent orientation relative to the viewing direction, preserving the visual appearance accuracy without additional computations. This approach minimizes the necessity for dynamic reorientation and BVH updates, streamlining the rendering process and optimizing computational resource usage. By integrating orthogonal triangle strips, DOTS and/or JOTS facilitates efficient real-time rendering for static strand-based objects in dynamic viewing scenarios.

One challenge with traditional BVH approaches is the need to rebuild the BVH when objects move, which can be computationally expensive. The processing circuits implementing DOTS and JOTS can address this by reducing the necessity for frequent BVH rebuilds. For static scenes, where the position of the hair and/or other strand-based objects does not change, the BVH does not need to be rebuilt. This can be particularly advantageous in games and films where background objects remain static. By orienting quads and/or triangles to maximize the silhouette width against the ray, DOTS and JOTS provide the expected radius from any direction without the need for real-time reorientation. Additionally, in dynamic scenes, such as strand-based object simulations where the vertices and positions of strands change, the BVH is likely updated. However, DOTS and JOTS facilitate this by maintaining an efficient structure that minimizes the computational load. When the camera moves but the strand-based object remains static, the BVH does not require rebuilding, thus avoiding unnecessary computations. This approach improves the rendering process, ensuring that the processing circuits update the BVH when necessary, such as when the strand-based object itself moves.

The method 300, at block 330, includes rendering the two quads for each of the plurality of linear segments. The rendering can be one or more operations of the processors. The processors can include a shader configured to compute shading and lighting effects for each of the two quads based on pre-calculated (or pre-determined) shading normals and light source data. For instance, the shader can execute instructions to calculate the diffuse and specular components of lighting by determining the interactions of light rays with the surfaces of the triangle primitives composing each quad. That is, rendering can include having the shader (e.g., executed using the processing circuits) use a plurality of proxy shading normals corresponding to a plurality of hit points (e.g., ray intersections) to approximate an appearance of convex curve segments or round curve segments (e.g., 3D curve). That is, the two quads can be shaded by calculating a plurality of proxy shading normals using a proxy infinite cone, corresponding to a plurality of hit points, to approximate an appearance of convex curve segments or round curve segments. In some embodiments, OTS can be built from hardware-accelerated triangles that do not require custom software raster or ray-intersection code, unlike non-linear curves, LSS, and ray-facing quads. For instance, DOTS geometric configuration can use fewer triangles than polytubes, requiring 4 triangles per segment, while the smallest polytube with three sides requires at least 6 triangles per segment. That is, DOTS segments do not need to reorient every frame when the camera moves, unlike camera-facing quads. Because DOTS geometry can be non-convex, the shader can ignore the geometric normals during rendering and instead compute a new shading normal to give DOTS curve segments (e.g., plurality of quad pairs) a rounded appearance as though the segment had a circular cross-section. For instance, when a ray hits a DOTS curve segment, the processing circuits can compute approximately where the hit point would have been if the curve segment was convex and round. From this imaginary hit point, the shader can compute the shading normal as the direction from the closest point on the curve out toward the hit point.

In some embodiments, secondary rays can be used to test for shadow visibility, bounce lighting, or for handling effects like translucency or subsurface scattering. For instance, the shader can use the imagined hit point, as computed (rendered) for the shading normal, and cast secondary rays from this new hit point. That is, this avoids sending rays from inside the concave regions of the DOTS curve segment, preventing accidental self-occlusion. DOTS segments can appear at their widest when the viewpoint is orthogonal to one of the two orthogonal quads (e.g., when the viewpoint lies on the plane of one of the two quads). In some embodiments, if DOTS is viewed from a 45-degree angle, the apparent width can be slightly smaller than the radius of the segment. To account for this loss, the shader can increase the radius of all DOTS primitives slightly so that the average radius from all viewing directions matches the intended radius. That is, the shader can apply a radius expansion factor to the plurality of linear segments to match an average width of the plurality of linear segments to an intended radius from a plurality of viewing angles. This adjustment can allow the shader to use DOTS to match the visual appearance of other curve types.

In some embodiments, the apparent width of DOTS for a uniform random orientation can be calculated as radius*cos (angle), where "angle" refers to the angle between the ray direction and the DOTS quadrilateral that is more parallel to the ray direction. That is, since the silhouette calculation can be 8-way rotationally symmetric, the average silhouette factor in units of radius can be determined as the integral of cos (angle) over 0 to 45 degrees, divided by the interval size. For instance, the reciprocal of that integral can be the inflation factor needed to match the width of DOTS to the width of a swept sphere on average, which calculates to 1/sin $(\pi/4)/(\pi/4){\approx}1.11$. By increasing the radius of DOTS by 11%, the average appearance can match that of swept-sphere curves or camera-facing quads. That is, this adjustment can align the visual consistency of DOTS with other curve types, enhancing the overall rendering quality.

In some embodiments, calculating shading normals can include the processing circuits determining the direction of the normal vector based on the camera's perspective. The camera perspective can be determined based on the relative position and orientation of the camera to the object. For instance, the position and orientation of the camera can be identified using the camera's spatial coordinates and its orientation vectors. That is, when viewing a round object, the shading normals at the edges point right and left, while the shading normal at the front points directly at the viewer. For instance, the shading normals remain consistent regardless of rotation, maintaining the illusion of roundness. In some embodiments, the processing circuits can use the shading normals to calculate the reflection direction when a ray hits the quad. For instance, an offset can be applied to the hit point to prevent the ray from hitting the same segment repeatedly. Additionally, the shading normals in computer graphics shading can be used to provide information about the angle between the incident light and the surface, guiding the lighting computation. In some embodiments, shading normals can be calculated differently than geometric normals to obtain an approximation having a round cylindrical appearance. That is, the processing circuits do not use the geometric normals and instead computes shading normals that represent the round primitive's look. For instance, when a ray intersects a DOTS segment, the processing circuits can compute an imaginary hit point as if the segment were convex and round. This imaginary hit point can then be used to determine the shading normal direction. In some embodiments, secondary rays can be utilized to test for shadow visibility, bounce lighting, or translucency effects. For instance, the secondary rays can be cast from the computed hit point, avoiding the concave regions of the DOTS segment and preventing self-occlusion.

In some embodiments, calculating the fixed reflection and transmission hit positions can include the processing circuits determining these positions based on the proxy infinite cone and the proxy LSS. The proxy infinite cone can be defined based on the relative orientation and position of the DOTS/ JOTS segment to the proxy LSS. For instance, the orientation and position of the infinite cone can be identified using the spatial coordinates and orientation vectors of the DOTS/ JOTS segment within the cone. That is, the infinite cone normal can guide the direction for reflection and transmission calculations, maintaining the consistency of these effects across different viewing angles. For instance, when viewing the segment, the proxy hit points, such as the fixed reflection hit position and the fixed transmission hit position, can be computed in relation to the proxy infinite cone and the corresponding proxy LSS (e.g., starting from the original hit position). In some embodiments, the processing circuits can use the proxy hit points to determine the next ray direction after interacting with the segment. For instance, the proxy LSS with spherical endcaps can provide an accurate reference for computing these hit points, preventing inaccuracies in reflection or transmission effects. In some embodiments, the proxy hit points can be calculated differently than other hit points to approximate the interaction with a round cylinder. That is, the processing circuits do not rely solely on geometric data but instead use the proxy infinite cone, proxy LSS, and the original hit position to determine accurate hit points for reflection and transmission. For instance, when a ray intersects a DOTS segment, the processing circuits can compute the reflection or transmission hit points as if the segment were contained within a convex, round boundary. In some embodiments, secondary rays can be utilized to test for additional effects such as shadow visibility, bounce lighting, or translucency. For instance, the secondary rays can be cast from the computed proxy hit points, using the proxy infinite cone and its normal.

Figure 4A:
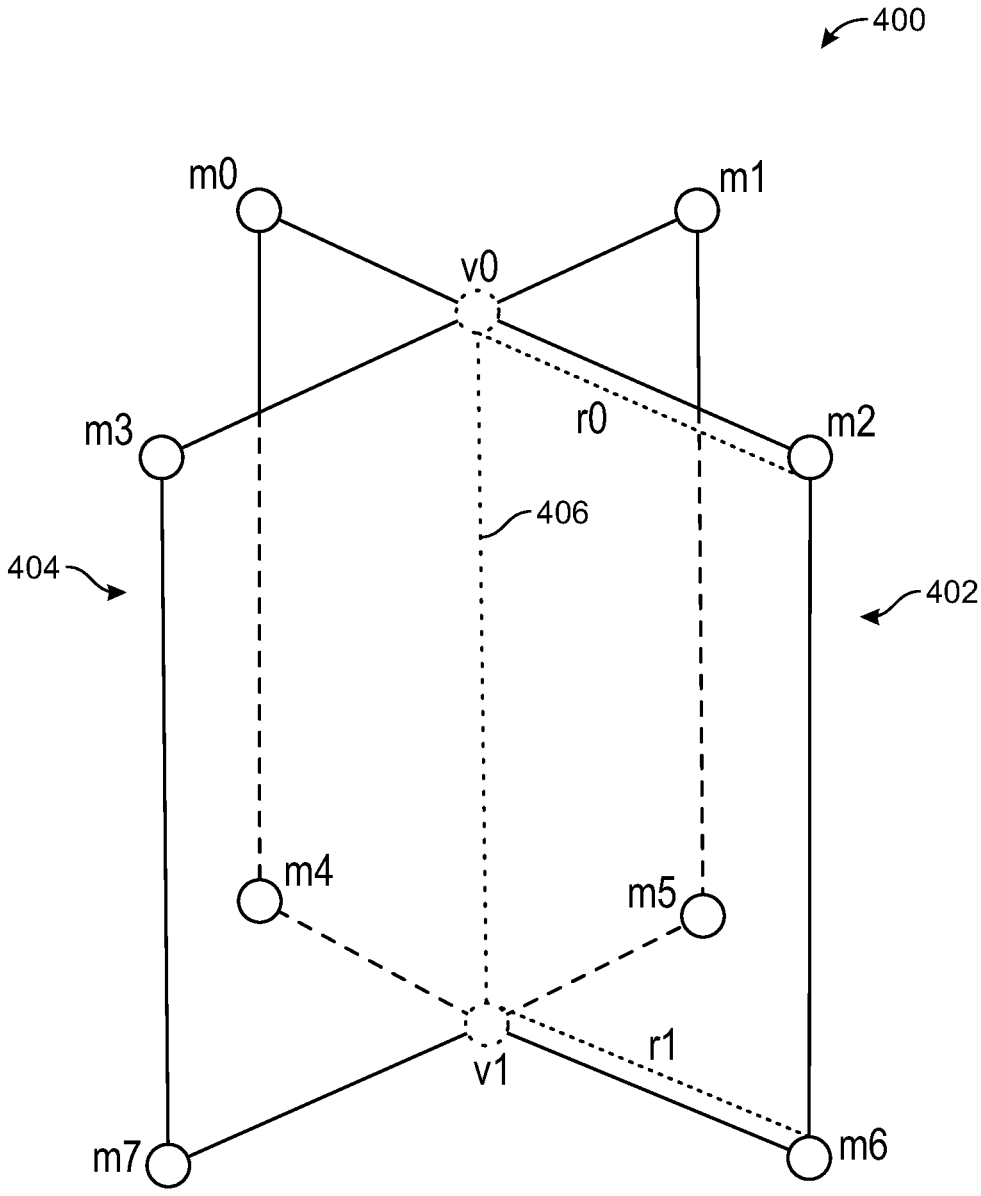
FIG. 4A depicts a diagram representing a portion of a strand-based object approximated using quads and linear segments, in accordance with some embodiments of the present disclosure.

Referring to FIG. 4A, depicting a diagram 400 representing a portion of a strand-based object approximated using quads and linear segments, in accordance with some embodiments of the present disclosure. The vertices v0 and v1 mark the endpoints of a linear segment, with r0 and r1 representing the radii at these endpoints, respectively. The quads can be defined by the points m0, m1, m2, m3, m4, m5, m6, m7. The vertices m0, m1, m2, and m3 can form the quad 402, while m4, m5, m6, and m7 can form the quad 404. The line segment 406 connects v0 to v1 and can indicate the linear segment's direction and length. Each quad 402 and 404 can be positioned orthogonally relative to the linear segment. The quads 402 and 404 can extend along the segment to create a 3D representation of the strand-based object, maintaining visual consistency by adjusting the angles and positions of the quads dynamically based on the segment's curvature and orientation.

Figure 4B:
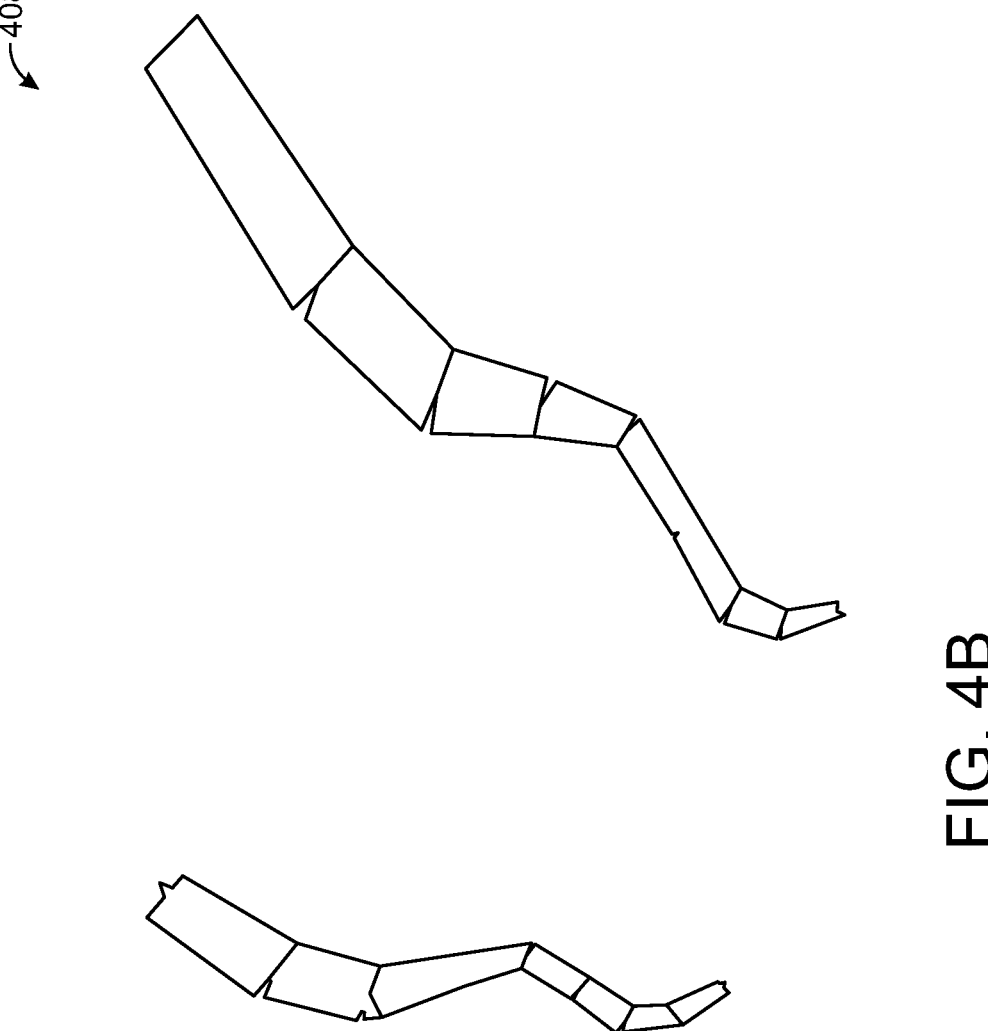
FIG. 4B depicts a DOTS geometric configuration of a strand-based object, in accordance with some embodiments of the present disclosure.

Referring to FIG. 4B, depicting a DOTS geometric configuration 408 of a strand-based object, in accordance with some embodiments of the present disclosure. The depicted configuration 408 shows how disjoint orthogonal triangle strips (DOTS) can be utilized to represent the object. Each segment can be defined by a pair of quads that do not share vertices with adjacent segments, resulting in a distinct separation at each junction. This disjoint configuration improves the computational process by eliminating or reducing the need for recalibrating the position and orientation of vertices at runtime. In some embodiments, the cross-sectional view depict how the quads form a non-convex structure.

Figure 4C:
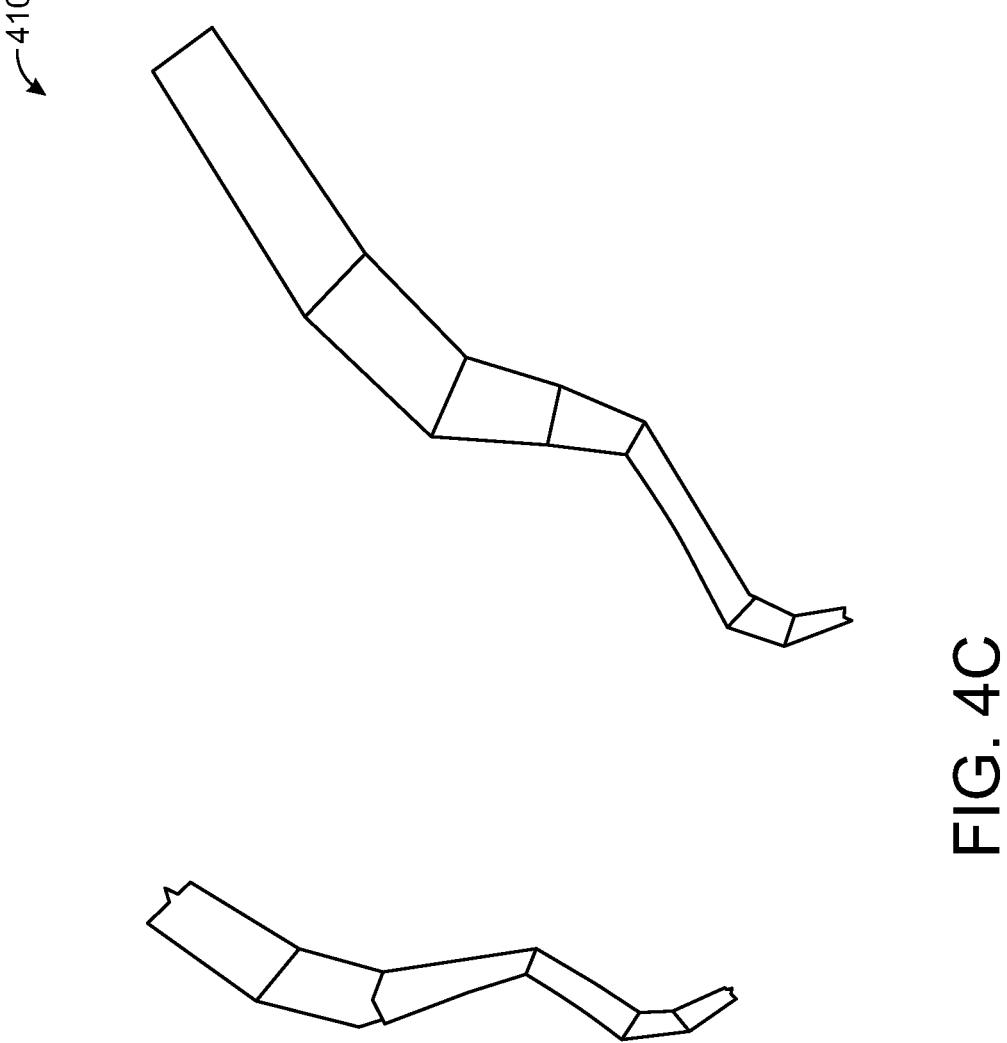
FIG. 4C depicts a JOTS geometric configuration of a strand-based object, in accordance with some embodiments of the present disclosure.

Referring to FIG. 4C, depicting a JOTS geometric configuration 410 of a strand-based object, in accordance with some embodiments of the present disclosure. The depicted configuration shows how joint orthogonal triangle strips (JOTS) can be utilized to represent the object. That is, each pair of quads can share vertices with adjacent segments, creating a continuous connection. In some embodiments, the joint configuration improves visual continuity between segments.

Figure 5A:
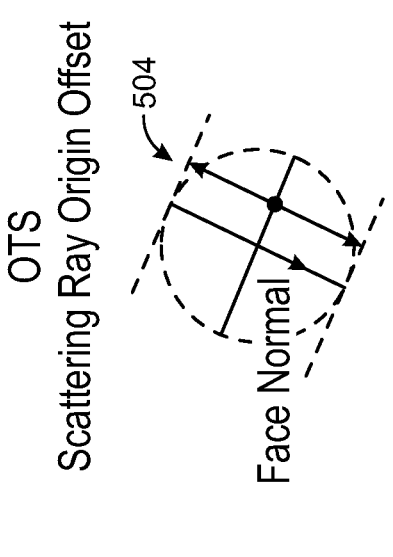
FIG. 5A depicts different shading normal configurations for various geometries, in accordance with some embodiments of the present disclosure.
Figure 5A:
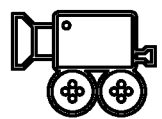
Figure 5A:
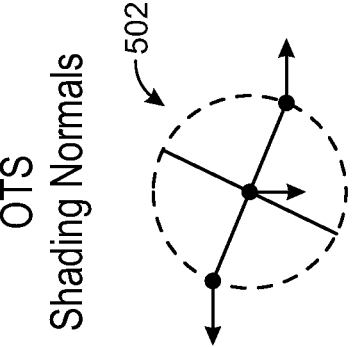
Figure 5A:
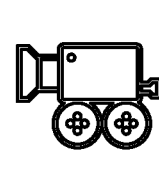
Figure 5A:
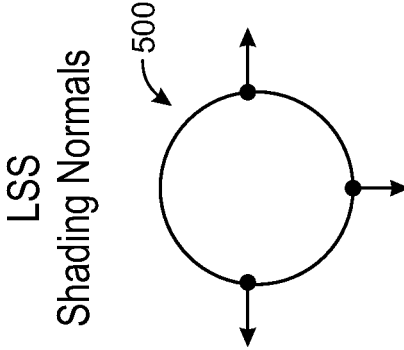
Figure 5A:
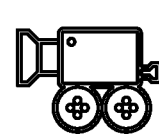

Referring to FIG. 5A, depicting different shading normal configurations for various geometric structures, in accordance with some embodiments of the present disclosure. The LSS shading normals 500 can represent surface normals pointing outward from a cylindrical surface. The OTS shading normals 502 can depict the approximation of a circular cross-section using orthogonal triangle strips, where the shading normals can be computed to create the appearance of a round surface. In some embodiments, the OTS shading normals 502 can include (i) a normal pointing from the leftmost pixel of the OTS to the left, (ii) a normal pointing from the rightmost pixel of the OTS to the right, and (iii) a normal pointing from the centerline pixel of the OTS towards the camera. The OTS with scattering ray origin offset 504 configuration can depict an offset for secondary rays to prevent self-occlusion. In some embodiments, the face normals can extend from the intersection point where the rays meet the quad surface. For instance, the offsets can be based on the dot product between the face normal and the scattering direction, ensuring that the ray origin does not reside within the concave regions, preventing self-occlusion. Additionally, the camera indicates the perspective from which these normals and offsets can be calculated.

Figure 5B:
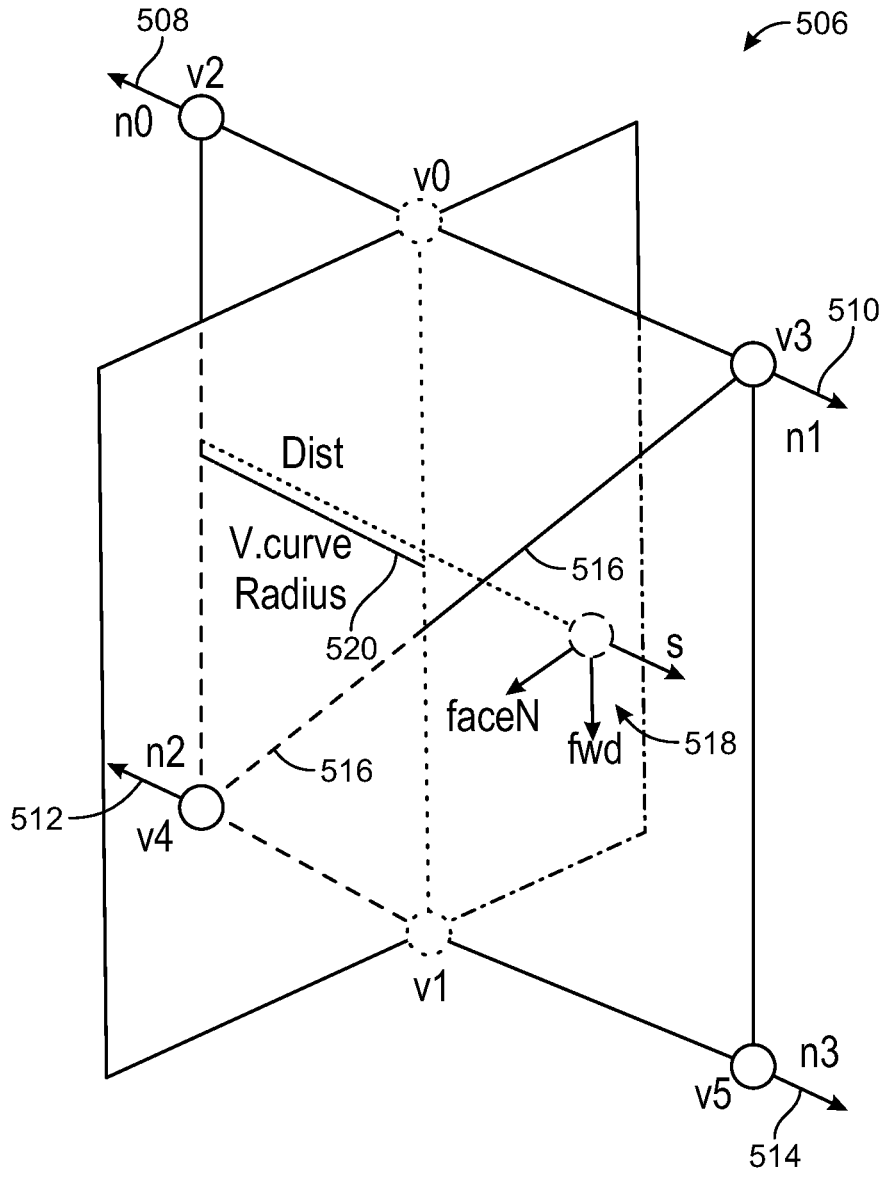
FIG. 5B depicts geometric and shading normal calculations for a DOTS configuration, in accordance with some embodiments of the present disclosure.

Referring to FIG. 5B, depicting the geometric and shading normal calculations for a DOTS configuration, in accordance with some embodiments of the present disclosure. In some embodiments, the normals (n0, n1, n2, n3) can extend from vertices of the quads. Specifically, n0 508 extends from v0, n1 510 extends from v1, n2 512 extends from v2, and n3 514 extends from v3. Additionally, the virtual curve radius 520 can represent the radius of the strand-based object. The linear segment can be defined between v4 and v5. In some embodiments, the divider 516 can divide the primitive triangle of one quad, creating two triangles. At intersection point(s) 518, vectors can be defined to represent the face normal (faceN), forward direction (fwd), and vector s. The processing circuits can determine the vectors to calculate the shading normals. The intersection point(s) 518 can be where the ray intersects the segment, and the face normal (faceN) can be used to calculate the shading normal. In some embodiments, the shading normal can provide accurate lighting and shading effects by approximating where the hit point would be if the segment were convex and round.

Figure 5C:
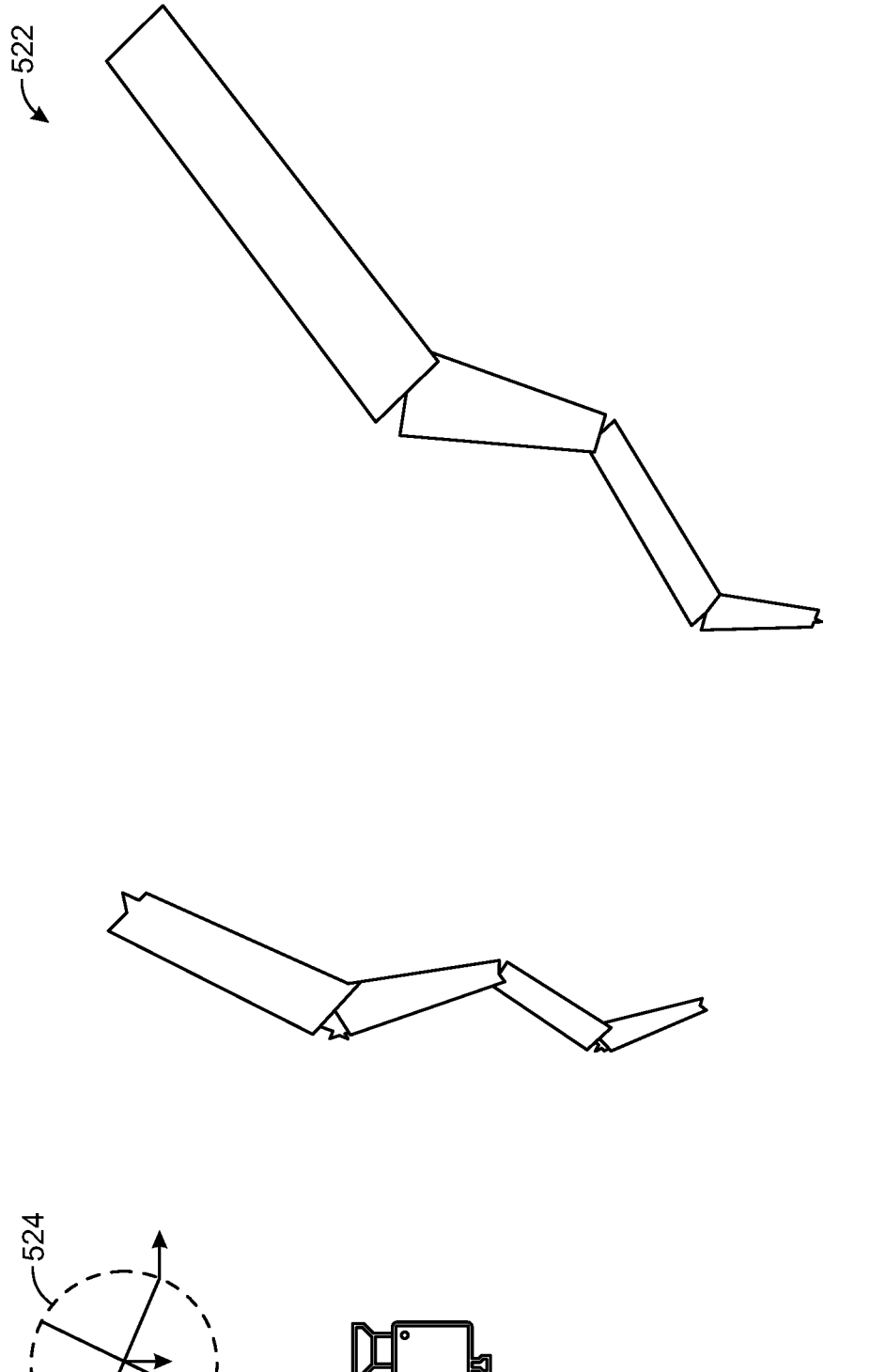
FIG. 5C depicts a DOTS geometric configuration for a strand-based rendering object, in accordance with some embodiments of the present disclosure.

Referring now to FIG. 5C, depicting a DOTS geometric configuration for a strand-based rendering object 522, in accordance with some embodiments of the present disclosure. The shading normals 524 can be used to maintain the illusion of a round shape. That is, these shading normals can create the appearance of a cylindrical surface by approximating the shading as if the surface were convex. This approach facilitates consistent visual fidelity and accurate lighting effects across different viewing angles.

Figure 5D:
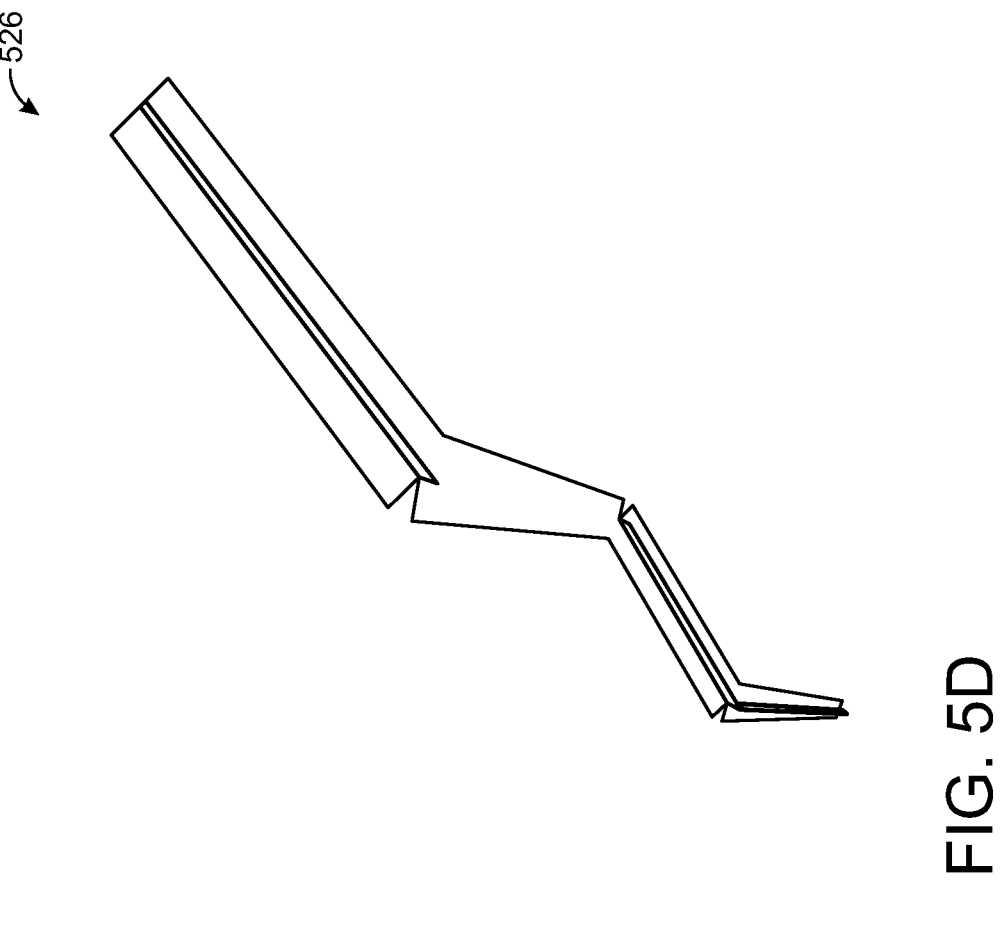
FIG. 5D depicts an embodiment of flat normals on a strand-based rendering object, in accordance with some embodiments of the present disclosure.
Figure 5D:
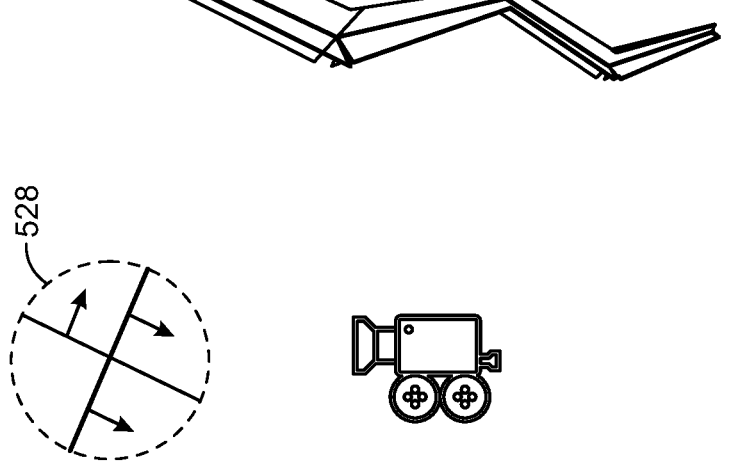

Referring now to FIG. 5D, depicting an embodiment of flat normals 528 on a strand-based rendering object 526, in accordance with some embodiments of the present disclosure. In this embodiment, the normals are not adjusted to create the illusion of roundness. Instead, the rendering can be based on the actual geometry of the quads, resulting in a flat appearance. That is, this embodiment does not provide the same level of visual realism as the shading normal approach used in DOTS and/or JOTS (shown in FIG. 5C).

Figure 5E:
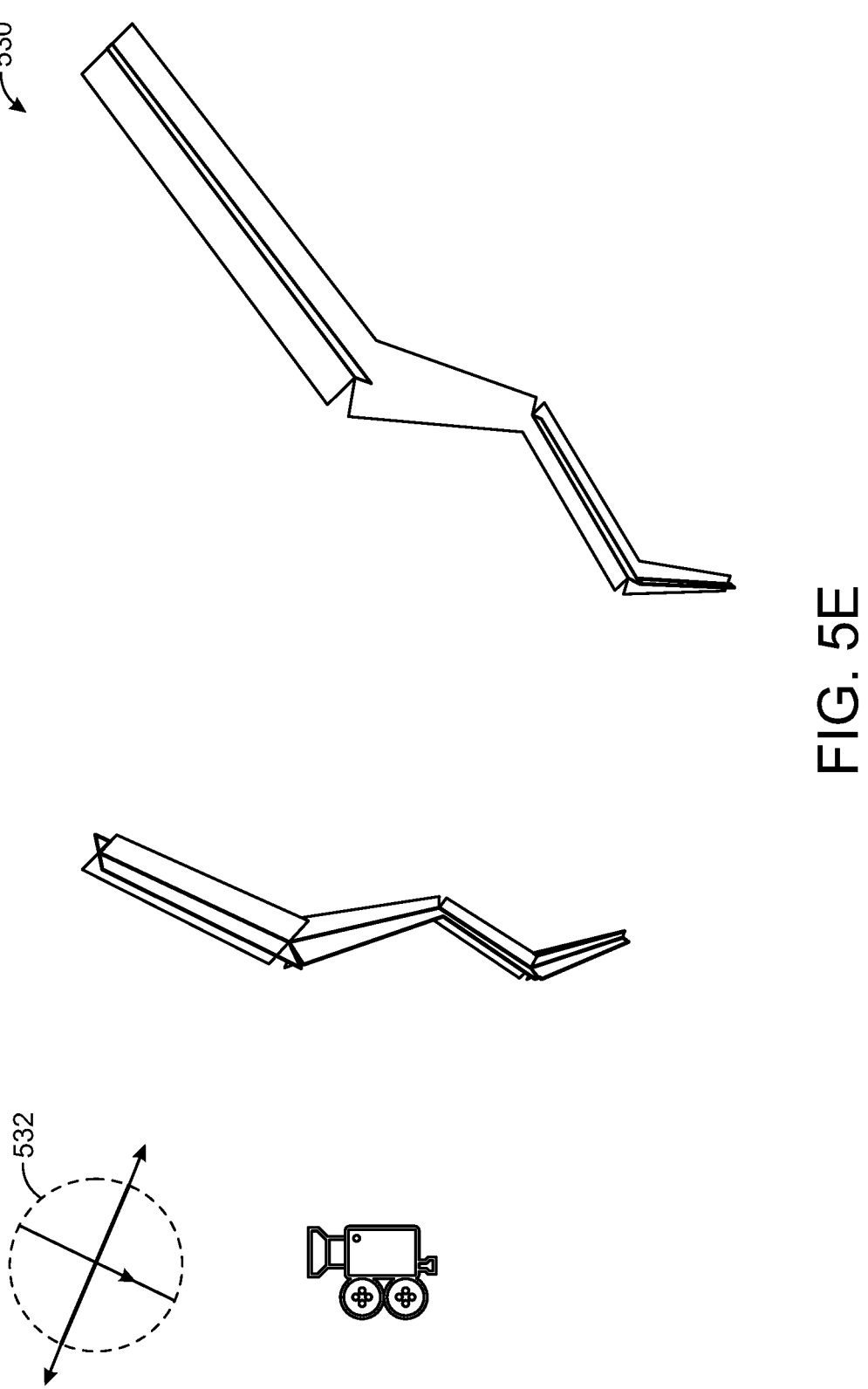
FIG. 5E depicts an embodiment of interpolated geometry normals on a strand-based rendering object, in accordance with some embodiments of the present disclosure.

Referring now to FIG. 5E, depicting an embodiment of interpolated geometry normals 532 on a strand-based rendering object 530, in accordance with some embodiments of the present disclosure. In some embodiments, this technique includes interpolating the normals across the surface of the quads to create a smoother transition between segments. While this method can enhance visual continuity, it does not achieve the same round appearance as the shading normals used in DOTS and/or JOTS (shown in FIG. 5C).

Figure 5F:
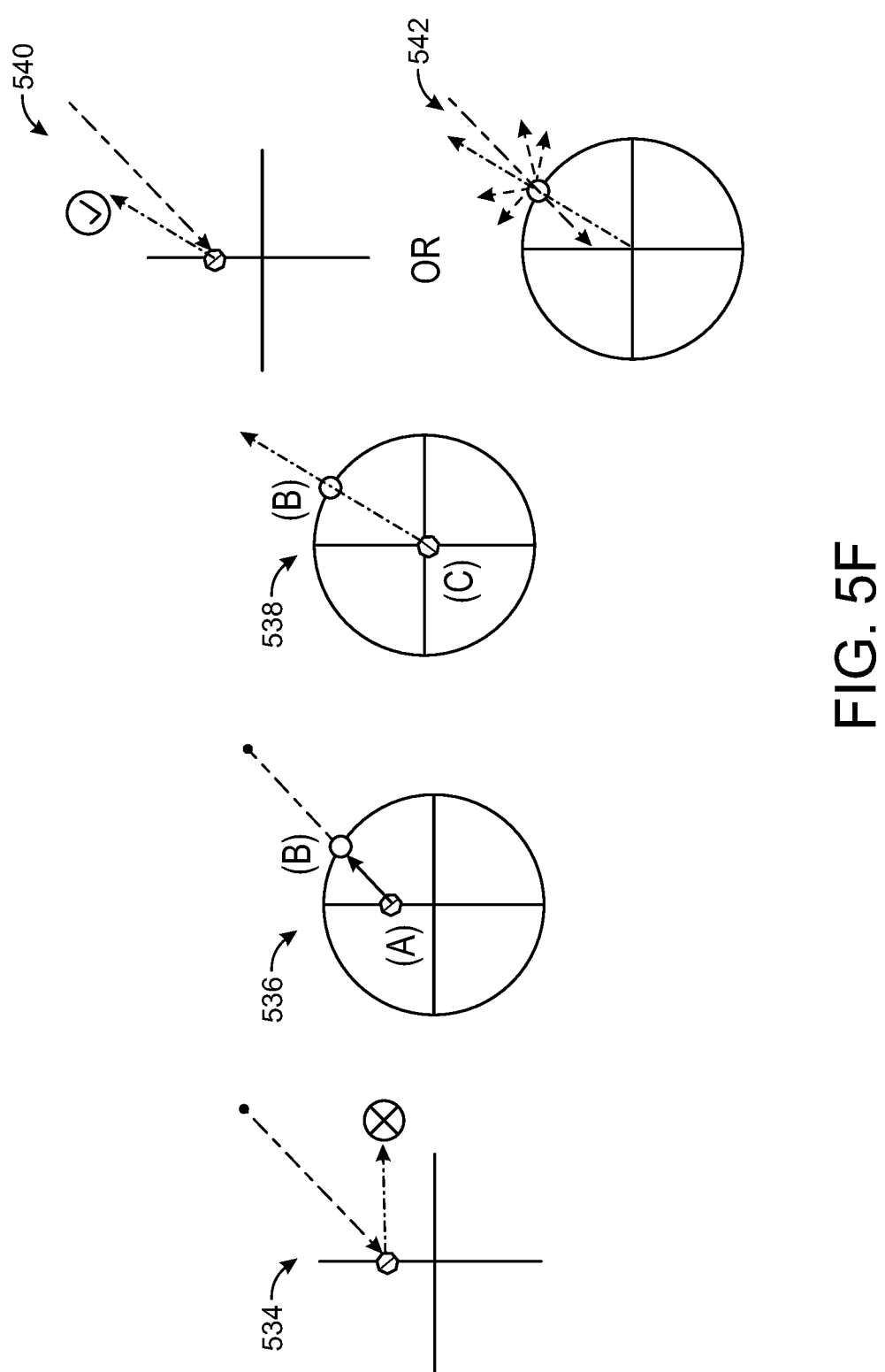
FIG. 5F depicts a method for determining the shading normals after a ray hits the DOTS, in accordance with some embodiments of the present disclosure.

Referring now to FIG. 5F, depicting a method for determining the shading normals after a ray hits the DOTS, in accordance with some embodiments of the present disclosure. It should be understood that while the method is depicted in 2D for clarity, it typically is performed by the processing circuits in 3D. Generally, the method of FIG. 5F depicts a software LSS method that recalculates shading normals to approximate the appearance of a round cross-section.

At step 534, the processing circuits can determine the geometric normal at the hit point is deemed undesirable for representing the curvature of the strand-based object. For instance, the incident ray is shown to intersect the DOTS at a hit point, where the geometric normal is not ideal. Next, at step 536, the processing circuits can trace the ray in reverse from the geometric hit point (A) to find the intersection (B) with the enclosing circle representing the strand's cross-section. That is, the intersection point (B) can reflect the strand's curvature. At step 538, a processing circuits can determine a vector from the center (C) of the enclosing circle through point (B), establishing a shading normal that represents the strand's curvature for accurate rendering (e.g., shading).

In some embodiments, at step 540, a first alternative embodiment is shown where the processing circuits derive the shading normal directly from the geometric hit point (A). That is, the derivation bypasses the additional computation of finding point (B) but may not provide as accurate a representation of the curvature. In some embodiments, at step 542, another alternative embodiment is shown where the processing circuits perform a secondary rays cast from the new hit point (B) to simulate effects (e.g., shadow visibility and translucency). That is, the secondary rays can maintain the visual accuracy of the strand-based object by considering its curvature and shading accordingly.

In some embodiments, determining the shading normals can include using the DOTS method or by dynamically recalculating shading normals. However, it should be understood that while two methods are shown to determine the shading normals, other techniques or approaches may also be utilized depending on the specific application requirements. For instance, alternative methods can include ray tracing algorithms that account for complex lighting scenarios or machine learning models trained to predict shading normals. That is, various approaches can be employed to enhance the visual fidelity and rendering efficiency of strand-based objects in different rendering environments.

The processors, systems, and/or methods described herein can be implemented by or included in at least one a control system for an autonomous or semi-autonomous machine. The system can include a perception system for an autonomous or semi-autonomous machine. The system can include a system implemented using a robot. The system can include an aerial system. The system can include a medical system. The system can include a boating system. The system can include a smart area monitoring system. The system can include a system for performing deep learning operations. The system can include a system for performing simulation operations. The system can include a system for generating or presenting virtual reality (VR) content, augmented reality (AR) content, or mixed reality (MR) content. The system can include a system for performing digital twin operations. The system can include a system implemented using an edge device. The system can include a system incorporating one or more virtual machines (VMs). The system can include a system for generating synthetic data. The system can be implemented at least partially in a data center. The system can include a system for performing conversational artificial intelligence (AI) operations. The system can include a system for performing generative AI operations. The system can include a system implementing language models. The system can include a system for performing one or more operations using one or more vision language models (VLMs). The system can include a system implementing large language models (LLMs). The system can include a system for performing one or more operations using one or more multi-modal language models. The system can include a system for hosting one or more real-time streaming applications. The system can include a system for performing light transport simulation. The system can include a system for performing collaborative content creation for 3D assets. In an aspect, the system can be implemented at least partially using cloud computing resources.

Figure 5G:
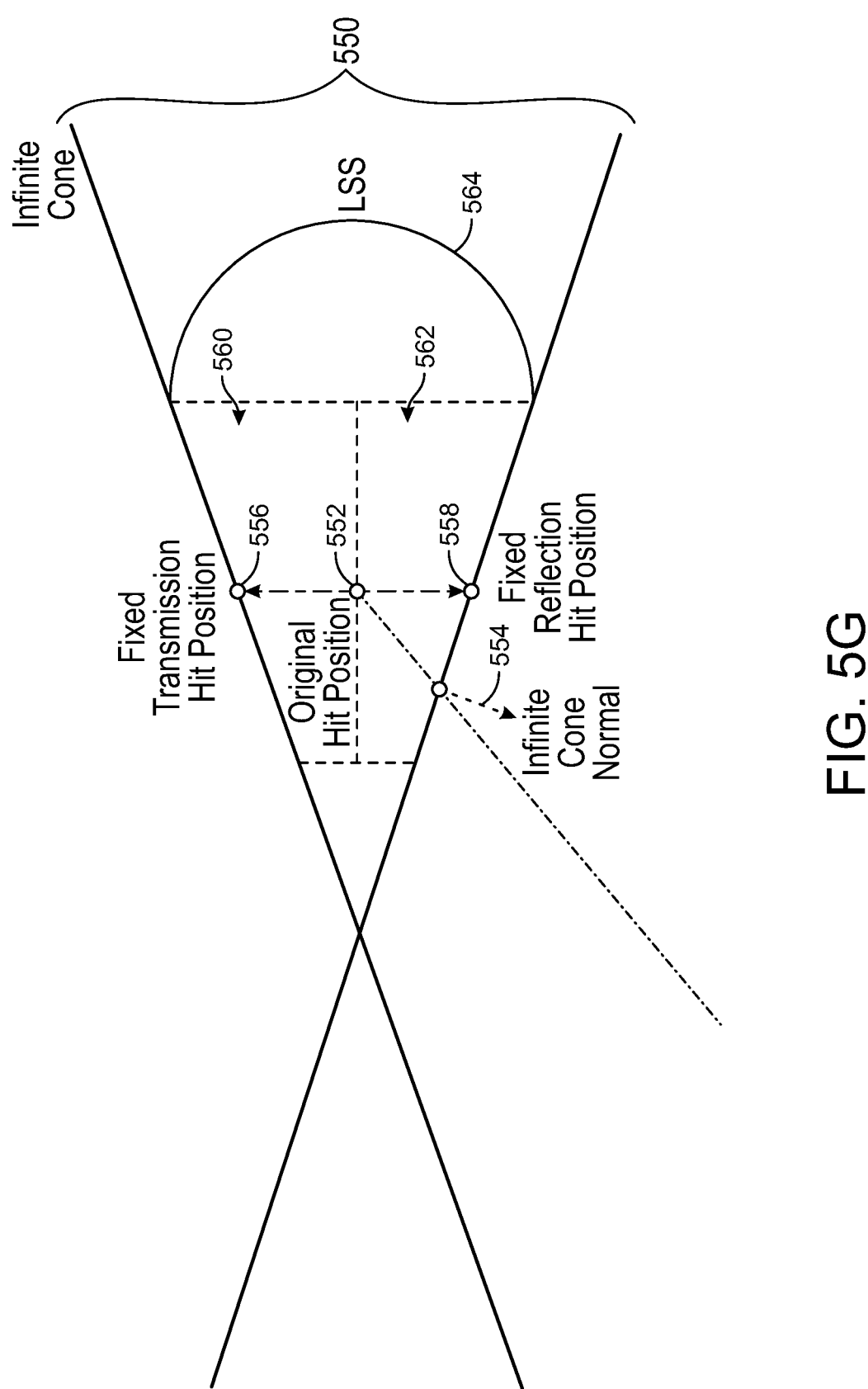
FIG. 5G depicts a method for determining the fixed reflection and transmission hit positions in relation to DOTS/JOTS and LSS segments, in accordance with some embodiments of the present disclosure.

Referring now to FIG. 5G, depicting a infinite cone 550 used in determining the fixed reflection and transmission hit positions in relation to DOTS/JOTS and LSS segments, in accordance with some embodiments of the present disclosure. In FIG. 5G, the infinite cone 550 defines the geometric boundary that contains the DOTS/JOTS segments (e.g., quad 560 and quad 562) providing a context for calculating interaction points. In some embodiments, the original hit position 552 (sometimes referred to as the "original hit point 552") can be positioned and/or located on the quad that is out of view, either above or below the top-view quad. For instance, the top-view quad can be quad 560. The camera can be aligned with quad 560 from a top-down perspective. In this example, the other quad (e.g., quad 562) can be parallel to the camera and therefore not visible in the view shown in FIG. 5G. The original hit position 552 can represent the initial intersection of the ray with the DOTS/JOTS segment, even though the quad (e.g., quad 562) containing the hit point is not visible in this perspective.

In some embodiments, once a ray intersects a DOTS or JOTS primitive, proxy normals can be computed by re-intersecting the ray with a proxy infinite cone 550 that contains the DOTS/JOTS segment (e.g., quads 560 and 562), as well as the corresponding proxy LSS 564. In some embodiments, the proxy infinite cone 550 can used to improve the intersection calculations, as the ray-cone intersection can be computationally inexpensive. That is, the proxy infinite cone 550 can serve as a geometric boundary within which the interactions occur, containing both the DOTS/JOTS segment (e.g., quads 560 and 562) and the proxy LSS 564. The infinite cone normal 554, derived from this intersection, can provide a reference for determining the direction of reflection or transmission relative to the strand-based object. For instance, because the proxy infinite cone 550 contains the DOTS/JOTS segment, the ray-cone intersection can be calculated without the need to traverse the entire scene. In this example, the infinite cone normal 554 can be a vector that represents the direction perpendicular to the surface of the infinite cone at the point where the ray intersects the cone. That is, the ray-cone intersection can be the point where the ray intersects the surface of the infinite cone 550, and the infinite cone normal 554 can be calculated at that intersection point to determine the direction of reflection or transmission for rendering purposes.

In some embodiments, the fixed reflection hit position 558 and the fixed transmission hit position 556 can be computed differently based on the next bounce of the ray. In some embodiments, when a proxy hit point is needed (e.g., when secondary rays are required for reflections, refractions, or shadows) it can be computed using the proxy LSS 564 (e.g., which has spherical endcaps). That is, the proxy LSS 564 can provide a reference for calculating the proxy hit points (e.g., the fixed reflection hit position 558 and the fixed transmission hit position 556) to facilitate accurate rendering and reflection effects. For instance, the fixed reflection hit position 558 and the fixed transmission hit position 556 can be derived as specific proxy hit points, which can be determined after the ray interacts with the DOTS/JOTS segment. This can results in calculations of reflections and transmissions within the geometric boundary defined by the proxy infinite cone 550 and its associated normal 554. Additionally, the combination of using a proxy infinite cone 550 for normals and a proxy LSS 564 for hit points aligns the visual appearance of scenes with LSS primitives, as opposed to DOTS/JOTS primitives, resulting in a rendering process that maintains consistent and visual accuracy.

Example Content Streaming System

Figure 6:
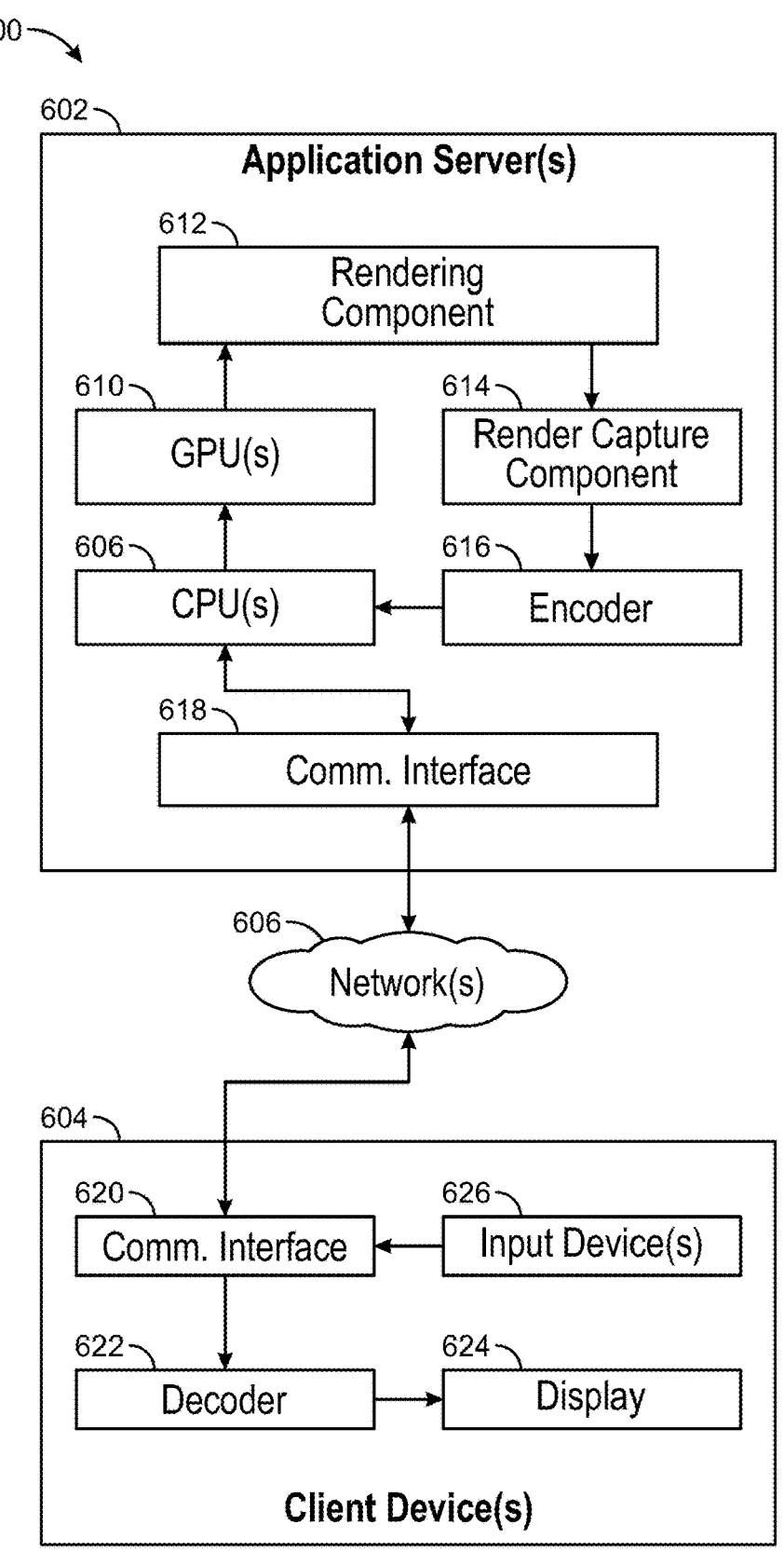
FIG. 6 is a block diagram of an example content streaming system suitable for use in implementing some embodiments of the present disclosure.

Now referring to FIG. 6, FIG. 6 is an example system diagram for a system 600, in accordance with some embodiments of the present disclosure. FIG. 6 includes application server(s) 602 (which can include similar components, features, and/or functionality to the example computing device 106 of FIGS. 1-2), client device(s) 604 (which can include similar components, features, and/or functionality to the example computing device 700 of FIG. 7), and network(s) 606 (which can be similar to the network(s) described herein). In some embodiments of the present disclosure, the system 600 can be implemented to perform model training/updating and runtime operations. The application session can correspond to a game streaming application (e.g., NVIDIA GeFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types. For instance, the system 600 can be implemented to receive input indicating one or more features of output to be generated using a neural network model, provide the input to the model to cause the model to generate the output, and use the output for various operations such as display or simulation operations.

In the system 600, for an application session, the client device(s) 604 can only receive input data in response to inputs to the input device(s), transmit the input data to the application server(s) 602, receive encoded display data from the application server(s) 602, and display the display data on the display 624. As such, the more computationally intense computing and processing is offloaded to the application server(s) 602 (e.g., rendering—in particular ray or path tracing—for graphical output of the application session is executed by the GPU(s) of the game server(s) 602). In other words, the application session is streamed to the client device(s) 604 from the application server(s) 602, thereby reducing the requirements of the client device(s) 604 for graphics processing and rendering.

For instance, with respect to an instantiation of an application session, a client device 604 can be displaying a frame of the application session on the display 624 based on receiving the display data from the application server(s) 602. The client device 604 can receive an input to one of the input device(s) and generate input data in response, such as to provide prompts as input for generation of 3D avatars. The client device 604 can transmit the input data to the application server(s) 602 via the communication interface 620 and over the network(s) 606 (e.g., the Internet—Web2 or Web3), and the application server(s) 602 can receive the input data via the communication interface 618. The CPU(s) can receive the input data, process the input data, and transmit data to the GPU(s) that causes the GPU(s) to generate a rendering of the application session. For instance, the input data can be representative of a movement or animation of a character of the user in a game session of a game application, firing a weapon, reloading, passing a ball, turning a vehicle, etc. The rendering component 612 can render the application session (e.g., representative of the result of the input data) and the render capture component 614 can capture the rendering of the application session as display data (e.g., as image data capturing the rendered frame of the application session). The rendering of the application session can include ray or path-traced lighting and/or shadow effects, computed using one or more parallel processing units—such as GPUs, which can further employ the use of one or more dedicated hardware accelerators or processing cores to perform ray or path-tracing techniques—of the application server(s) 602. In some embodiments, one or more virtual machines (VMs)—e.g., including one or more virtual components, such as vGPUs, vCPUs, etc.—can be used by the application server(s) 602 to support the application sessions. The encoder 616 can then encode the display data to generate encoded display data and the encoded display data can be transmitted to the client device 604 over the network(s) 606 via the communication interface 618. The client device 604 can receive the encoded display data via the communication interface 620 and the decoder 622 can decode the encoded display data to generate the display data. The client device 604 can then display the display data via the display 624.

Example Computing Device

Figure 7:
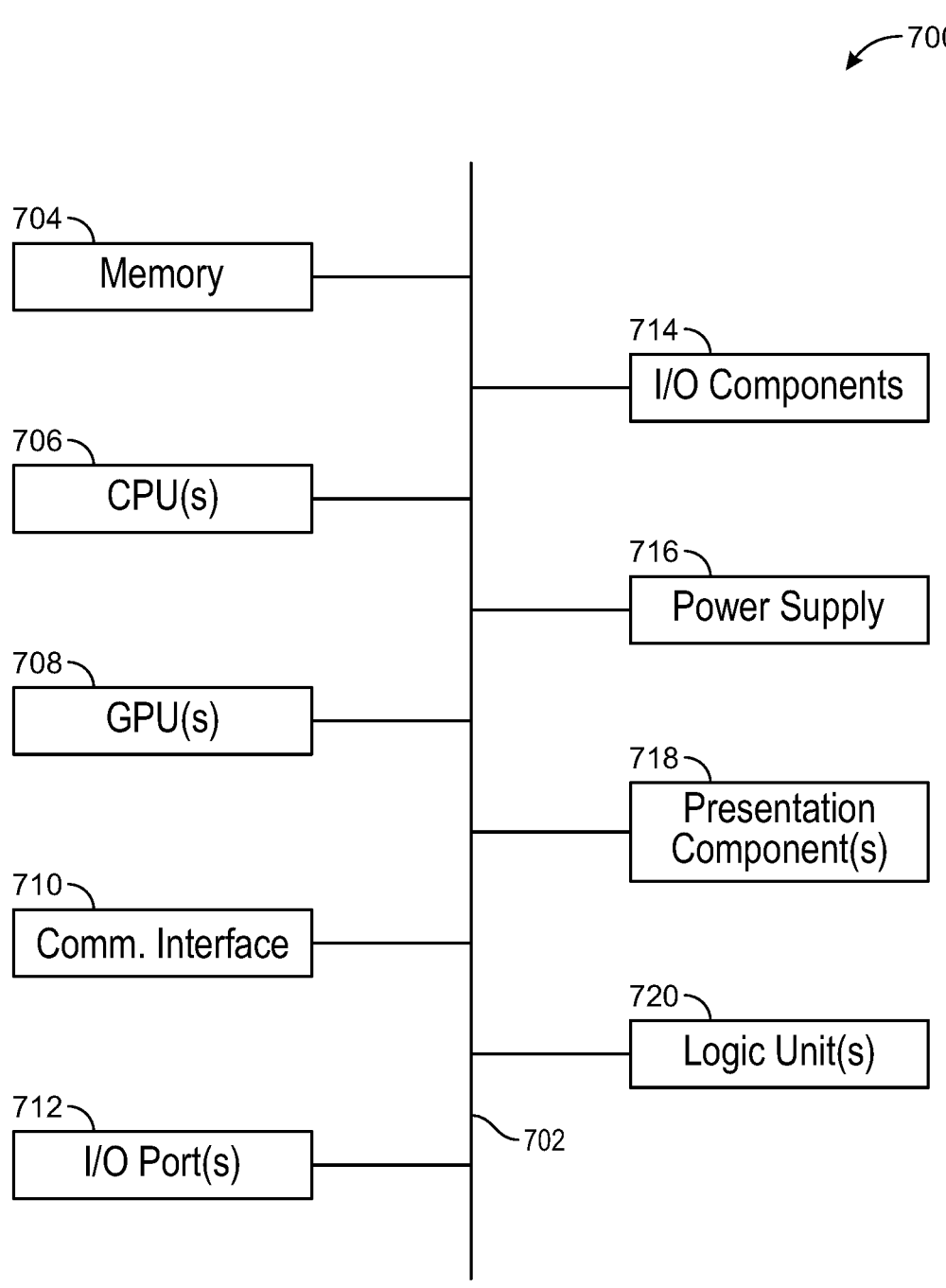
FIG. 7 is a block diagram of an example computing device suitable for use in implementing some embodiments of the present disclosure.

FIG. 7 is a block diagram of an example computing device(s) 700 suitable for use in implementing some embodiments of the present disclosure. Computing device 700 can include an interconnect system 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, one or more presentation components 718 (e.g., display(s)), and one or more logic units 720. In at least one embodiment, the computing device(s) 700 can include one or more virtual machines (VMs), and/or any of the components thereof can include virtual components (e.g., virtual hardware components). For non-limiting examples, one or more of the GPUs 708 can include one or more vGPUs, one or more of the CPUs 706 can include one or more vCPUs, and/or one or more of the logic units 720 can include one or more virtual logic units. As such, a computing device(s) 700 can include discrete components (e.g., a full GPU dedicated to the computing device 700), virtual components (e.g., a portion of a GPU dedicated to the computing device 700), or a combination thereof.

Although the various blocks of FIG. 7 are shown as connected via the interconnect system 702 with lines, this is not intended to be limiting and is for clarity only. For instance, in some embodiments, a presentation component 718, such as a display device, can be considered an I/O component 714 (e.g., if the display is a touch screen). As another example, the CPUs 706 and/or GPUs 708 can include memory (e.g., the memory 704 can be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 can represent one or more links or busses, such as an address bus, a data bus, a control bus, or a combination thereof. The interconnect system 702 can be arranged in various topologies, including but not limited to bus, star, ring, mesh, tree, or hybrid topologies. The interconnect system 702 can include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 can be directly connected to the memory 704. Further, the CPU 706 can be directly connected to the GPU 708. Where there is direct, or point-to-point connection between components, the interconnect system 702 can include a PCIe link to carry out the connection. In these examples, a PCI bus need not be included in the computing device 700.

The memory 704 can include any of a variety of computer-readable media. The computer-readable media can be any available media that can be accessed by the computing device 700. The computer-readable media can include both volatile and nonvolatile media, and removable and non-removable media. By way of example, and not limitation, the computer-readable media can include computer-storage media and communication media.

The computer-storage media can include both volatile and nonvolatile media and/or removable and non-removable media implemented in any method or technology for storage of information such as computer-readable instructions, data structures, program modules, and/or other data types. For instance, the memory 704 can store computer-readable instructions (e.g., that represent a program(s) and/or a program element(s), such as an operating system. Computer-storage media can include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, quantum memories, or any other medium which can be used to store the desired information and which can be accessed by computing device 700. As used herein, computer storage media does not include signals per se.

The computer storage media can embody computer-readable instructions, data structures, program modules, and/or other data types in a modulated data signal such as a carrier wave or other transport mechanism and includes any information delivery media. The term "modulated data signal" can refer to a signal that has one or more of its characteristics set or changed in such a manner as to encode information in the signal. By way of example, and not limitation, the computer storage media can include wired media such as a wired network or direct-wired connection, and wireless media such as acoustic, RF, infrared and other wireless media. Combinations of any of the above should also be included within the scope of computer-readable media.

The CPU(s) 706 can be configured to execute at least some of the computer-readable instructions to control one or more components of the computing device 700 to perform one or more of the methods and/or processes described herein. The CPU(s) 706 can each include one or more cores (e.g., one, two, four, eight, twenty-eight, seventy-two, etc.) that are capable of handling a multitude of software threads simultaneously. The CPU(s) 706 can include any type of processor, and can include different types of processors depending on the type of computing device 700 implemented (e.g., processors with fewer cores for mobile devices and processors with more cores for servers). For instance, depending on the type of computing device 700, the processor can be an Advanced RISC Machines (ARM) processor implemented using Reduced Instruction Set Computing (RISC) or an x86 processor implemented using Complex Instruction Set Computing (CISC). The computing device 700 can include one or more CPUs 706 in addition to one or more microprocessors or supplementary co-processors, such as math co-processors.

In addition to or alternatively from the CPU(s) 706, the GPU(s) 708 can be configured to execute at least some of the computer-readable instructions to control one or more components of the computing device 700 to perform one or more of the methods and/or processes described herein. One or more of the GPU(s) 708 can be an integrated GPU (e.g., with one or more of the CPU(s) 706 and/or one or more of the GPU(s) 708 can be a discrete GPU. In embodiments, one or more of the GPU(s) 708 can be a coprocessor of one or more of the CPU(s) 706. The GPU(s) 708 can be used by the computing device 700 to render graphics (e.g., 3D graphics) or perform general purpose computations. For instance, the GPU(s) 708 can be used for General-Purpose computing on GPUs (GPGPU). The GPU(s) 708 can include hundreds or thousands of cores that are capable of handling hundreds or thousands of software threads simultaneously. The GPU(s) 708 can generate pixel data for output images in response to rendering commands (e.g., rendering commands from the CPU(s) 706 received via a host interface). The GPU(s) 708 can include graphics memory, such as display memory, for storing pixel data or any other suitable data, such as GPGPU data. The display memory can be included as part of the memory 704. The GPU(s) 708 can include two or more GPUs operating in parallel (e.g., via a link). The link can directly connect the GPUs (e.g., using NVLINK) or can connect the GPUs through a switch (e.g., using NVSwitch). When combined together, each GPU 708 can generate pixel data or GPGPU data for different portions of an output or for different outputs (e.g., a first GPU for a first image and a second GPU for a second image). Each GPU can include its own memory, or can share memory with other GPUs.

In addition to or alternatively from the CPU(s) 706 and/or the GPU(s) 708, the logic unit(s) 720 can be configured to execute at least some of the computer-readable instructions to control one or more components of the computing device 700 to perform one or more of the methods and/or processes described herein. In embodiments, the CPU(s) 706, the GPU(s) 708, and/or the logic unit(s) 720 can discretely or jointly perform any combination of the methods, processes and/or portions thereof. One or more of the logic units 720 can be part of and/or integrated in one or more of the CPU(s) 706 and/or the GPU(s) 708 and/or one or more of the logic units 720 can be discrete components or otherwise external to the CPU(s) 706 and/or the GPU(s) 708. In embodiments, one or more of the logic units 720 can be a coprocessor of one or more of the CPU(s) 706 and/or one or more of the GPU(s) 708.

Examples of the logic unit(s) 720 include one or more processing cores and/or components thereof, such as Data Processing Units (DPUs), Tensor Cores (TCs), Tensor Processing Units(TPUs), Pixel Visual Cores (PVCs), Vision Processing Units (VPUs), Image Processing Units (IPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 710 can include one or more receivers, transmitters, and/or transceivers that allow the computing device 700 to communicate with other computing devices via an electronic communication network, included wired and/or wireless communications. The communication interface 710 can include components and functionality to allow communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 720 and/or communication interface 710 can include one or more data processing units (DPUs) to transmit data received over a network and/or through interconnect system 702 directly to (e.g., a memory of) one or more GPU(s) 708. In some embodiments, a plurality of computing devices 700 or components thereof, which can be similar or different to one another in various respects, can be communicatively coupled to transmit and receive data for performing various operations described herein, such as to facilitate latency reduction.

The I/O ports 712 can allow the computing device 700 to be logically coupled to other devices including the I/O components 714, the presentation component(s) 718, and/or other components, some of which can be built in to (e.g., integrated in) the computing device 700. Illustrative I/O components 714 include a microphone, mouse, keyboard, joystick, game pad, game controller, satellite dish, scanner, printer, wireless device, etc. The I/O components 714 can provide a natural user interface (NUI) that processes air gestures, voice, or other physiological inputs generated by a user, such as to generate a prompt, image data, and/or video data. In some instances, inputs can be transmitted to an appropriate network element for further processing, such as to modify and register images. An NUI can implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 can be include depth cameras, such as stereoscopic camera systems, infrared camera systems, RGB camera systems, touchscreen technology, and combinations of these, for gesture detection and recognition. Additionally, the computing device 700 can include accelerometers or gyroscopes (e.g., as part of an inertia measurement unit (IMU)) that allow detection of motion. In some examples, the output of the accelerometers or gyroscopes can be used by the computing device 700 to render immersive augmented reality or virtual reality.

The power supply 716 can include a hard-wired power supply, a battery power supply, or a combination thereof. The power supply 716 can provide power to the computing device 700 to allow the components of the computing device 700 to operate.

The presentation component(s) 718 can include a display (e.g., a monitor, a touch screen, a television screen, a heads-up-display (HUD), other display types, or a combination thereof), speakers, and/or other presentation components. The presentation component(s) 718 can receive data from other components (e.g., the GPU(s) 708, the CPU(s) 706, DPUs, etc.), and output the data (e.g., as an image, video, sound, etc.).

Example Data Center

Figure 8:
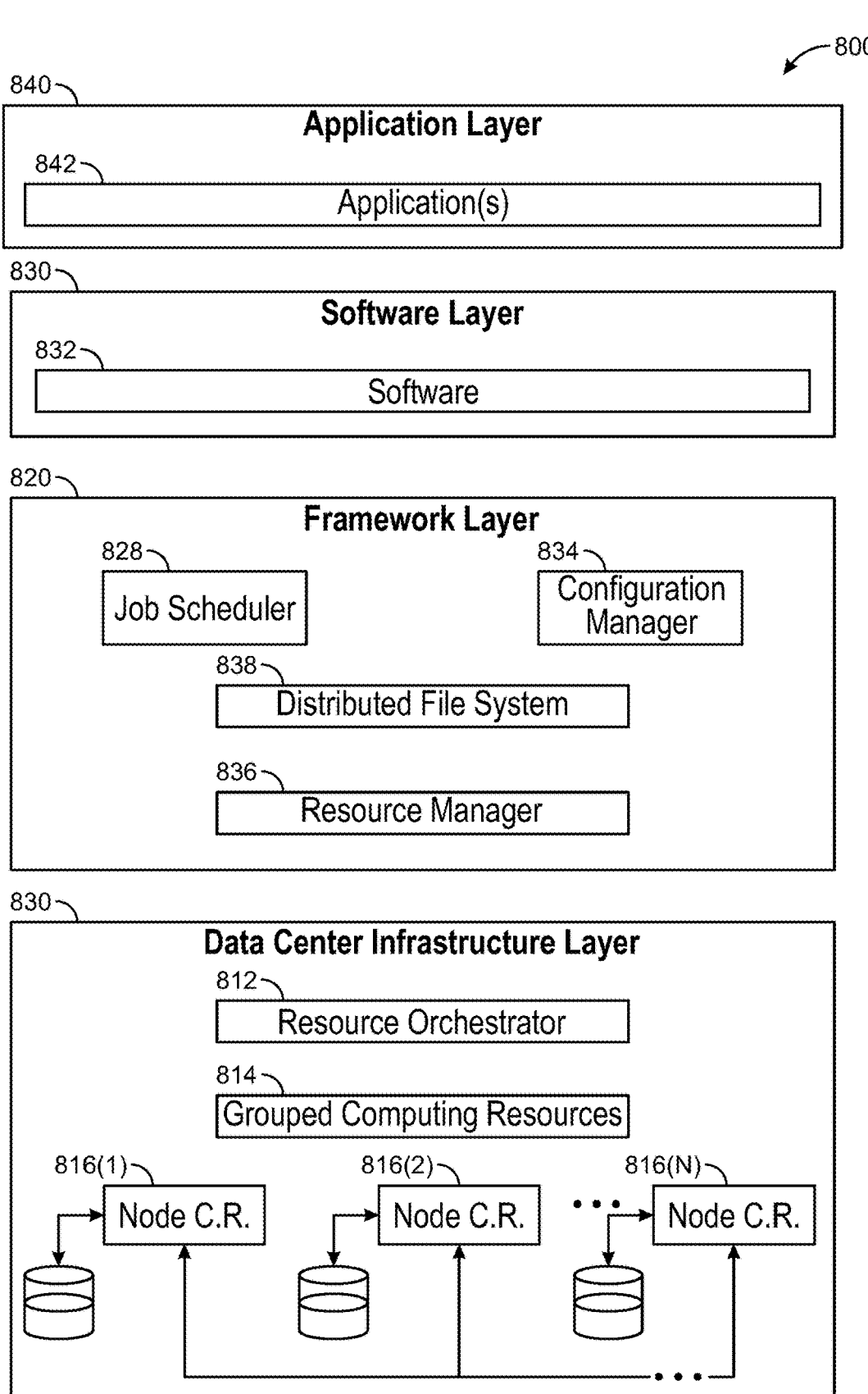
FIG. 8 is a block diagram of an example data center suitable for use in implementing some embodiments of the present disclosure.

FIG. 8 illustrates an example data center 800 that can be used in at least one embodiments of the present disclosure, such as to implement the environment 100 and/or the system 200 in one or more examples of the data center 800. The data center 800 can include a data center infrastructure layer 810, a framework layer 820, a software layer 830, and/or an application layer 840.

As shown in FIG. 8, the data center infrastructure layer 810 can include a resource orchestrator 812, grouped computing resources 814, and node computing resources ("node C.R.s") 816(1)-816(N), where "N" represents any whole, positive integer. In at least one embodiment, node C.R.s 816(1)-816(N) can include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 816(1)-816(N) can correspond to a server having one or more of the above-mentioned computing resources. In addition, in some embodiments, the node C.R.s 816(1)-816(N) can include one or more virtual components, such as vGPUs, vCPUs, and/or the like, and/or one or more of the node C.R.s 816(1)-816(N) can correspond to a virtual machine (VM).

In at least one embodiment, grouped computing resources 814 can include separate groupings of node C.R.s 816 housed within one or more racks (not shown), or many racks housed in data centers at various geographical locations (also not shown). Separate groupings of node C.R.s 816 within grouped computing resources 814 can include grouped compute, network, memory or storage resources that can be configured or allocated to support one or more workloads. In at least one embodiment, several node C.R.s 816 including CPUs, GPUs, DPUs, and/or other processors can be grouped within one or more racks to provide compute resources to support one or more workloads. The one or more racks can also include any number of power modules, cooling modules, and/or network switches, in any combination.

The resource orchestrator 812 can configure or otherwise control one or more node C.R.s 816(1)-816(N) and/or grouped computing resources 814. In at least one embodiment, resource orchestrator 812 can include a software design infrastructure (SDI) management entity for the data center 800. The resource orchestrator 812 can include hardware, software, or some combination thereof.

In at least one embodiment, as shown in FIG. 8, framework layer 820 can include a job scheduler 828, a configuration manager 834, a resource manager 836, and/or a distributed file system 838. The framework layer 820 can include a framework to support software 832 of software layer 830 and/or one or more application(s) 842 of application layer 840. The software 832 or application(s) 842 can respectively include web-based service software or applications, such as those provided by Amazon Web Services, Google Cloud and Microsoft Azure. The framework layer 820 can be, but is not limited to, a type of free and open-source software web application framework such as Apache SparkTM (hereinafter "Spark") that can utilize distributed file system 838 for large-scale data processing (e.g., "big data"). In at least one embodiment, job scheduler 828 can include a Spark driver to facilitate scheduling of workloads supported by various layers of data center 800. The configuration manager 834 can be capable of configuring different layers such as software layer 830 and framework layer 820 including Spark and distributed file system 838 for supporting large-scale data processing. The resource manager 836 can be capable of managing clustered or grouped computing resources mapped to or allocated for support of distributed file system 838 and job scheduler 828. In at least one embodiment, clustered or grouped computing resources can include grouped computing resource 814 at data center infrastructure layer 810. The resource manager 836 can coordinate with resource orchestrator 812 to manage these mapped or allocated computing resources.

In at least one embodiment, software 832 included in software layer 830 can include software used by at least portions of node C.R.s 816(1)-816(N), grouped computing resources 814, and/or distributed file system 838 of framework layer 820. One or more types of software can include, but are not limited to, Internet web page search software, e-mail virus scan software, database software, and streaming video content software.

In at least one embodiment, application(s) 842 included in application layer 840 can include one or more types of applications used by at least portions of node C.R.s 816(1)-816(N), grouped computing resources 814, and/or distributed file system 838 of framework layer 820. One or more types of applications can include, but are not limited to, any number of a genomics application, a cognitive compute, and a machine learning application, including training/updating or inferencing software, machine learning framework software (e.g., PyTorch, TensorFlow, Caffe, etc.), and/or other machine learning applications used in conjunction with one or more embodiments, such as to train, configure, update, and/or execute machine learning models.

In at least one embodiment, any of configuration manager 834, resource manager 836, and resource orchestrator 812 can implement any number and type of self-modifying actions based on any amount and type of data acquired in any technically feasible fashion. Self-modifying actions can relieve a data center operator of data center 800 from making possibly bad configuration decisions and possibly avoiding underutilized and/or poor performing portions of a data center.

The data center 800 can include tools, services, software or other resources to train/update one or more machine learning models (e.g., train/update machine learning models) or predict or infer information using one or more machine learning models (e.g., to generate a large language model) according to one or more embodiments described herein. For instance, a machine learning model(s) can be trained/updated by calculating weight parameters according to a neural network architecture using software and/or computing resources described above with respect to the data center 800. In at least one embodiment, trained/updated or deployed machine learning models corresponding to one or more neural networks can be used to infer or predict information using resources described above with respect to the data center 800 by using weight parameters calculated through one or more training/updating techniques, such as but not limited to those described herein.

In at least one embodiment, the data center 800 can use CPUs, application-specific integrated circuits (ASICs), GPUs, FPGAs, and/or other hardware (or virtual compute resources corresponding thereto) to perform training/updating and/or inferencing using above-described resources. Moreover, one or more software and/or hardware resources described above can be configured as a service to allow users to train/update or perform inferencing of information, such as image recognition, speech recognition, or other artificial intelligence services.

Example Network Environments

Network environments suitable for use in implementing embodiments of the disclosure can include one or more client devices, servers, network attached storage (NAS), other backend devices, and/or other device types. The client devices, servers, and/or other device types (e.g., each device) can be implemented on one or more instances of the computing device(s) 700 of FIG. 7—e.g., each device can include similar components, features, and/or functionality of the computing device(s) 700. In addition, where backend devices (e.g., servers, NAS, etc.) are implemented, the backend devices can be included as part of a data center 800, an example of which is described in more detail herein with respect to FIG. 8.

Components of a network environment can communicate with each other via a network(s), which can be wired, wireless, or both. The network can include multiple networks, or a network of networks. By way of example, the network can include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) can provide wireless connectivity.

Compatible network environments can include one or more peer-to-peer network environments—in which case a server cannot be included in a network environment—and one or more client-server network environments—in which case one or more servers can be included in a network environment. In peer-to-peer network environments, functionality described herein with respect to a server(s) can be implemented on any number of client devices.

In at least one embodiment, a network environment can include one or more cloud-based network environments, a distributed computing environment, a combination thereof, etc. A cloud-based network environment can include a framework layer, a job scheduler, a resource manager, and a distributed file system implemented on one or more of servers, which can include one or more core network servers and/or edge servers. A framework layer can include a framework to support software of a software layer and/or one or more application(s) of an application layer. The software or application(s) can respectively include web-based service software or applications. In embodiments, one or more of the client devices can use the web-based service software or applications (e.g., by accessing the service software and/or applications via one or more application programming interfaces (APIs)). The framework layer can be, but is not limited to, a type of free and open-source software web application framework such as that can use a distributed file system for large-scale data processing (e.g., "big data").

A cloud-based network environment can provide cloud computing and/or cloud storage that carries out any combination of computing and/or data storage functions described herein (or one or more portions thereof). Any of these various functions can be distributed over multiple locations from central or core servers (e.g., of one or more data centers that can be distributed across a state, a region, a country, the globe, etc.). If a connection to a user (e.g., a client device) is relatively close to an edge server(s), a core server(s) can designate at least a portion of the functionality to the edge server(s). A cloud-based network environment can be private (e.g., limited to a single organization), can be public (e.g., available to many organizations), and/or a combination thereof (e.g., a hybrid cloud environment).

The client device(s) can include at least some of the components, features, and functionality of the example computing device(s) 700 described herein with respect to FIG. 7. By way of example and not limitation, a client device can be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, a holographic display, a biometric authentication device, a quantum computing device, a neuroenhancement headset, an augmented reality glasses, any combination of these delineated devices, or any other suitable device.

The disclosure can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure can be practiced in a variety of system configurations, including hand-held devices, consumer electronics, general-purpose computers, more specialty computing devices, etc. The disclosure can also be practiced in distributed computing environments where tasks are performed by remote-processing devices that are linked through a communications network.

As used herein, a recitation of "and/or" with respect to two or more elements should be interpreted to mean only one element, or a combination of elements. For instance, "element A, element B, and/or element C" can include only element A, only element B, only element C, element A and element B, element A and element C, element B and element C, or elements A, B, and C. In addition, "at least one of element A or element B" can include at least one of element A, at least one of element B, or at least one of element A and at least one of element B. Further, "at least one of element A and element B" can include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

What is claimed is:

1. A system, comprising:
   one or more processors to execute operations comprising:
      one or more operations to obtain an approximation of a three-dimensional (3D) curve comprising a plurality of linear segments;
      one or more operations to determine two quadrilateral primitives (quads) for each of the plurality of linear segments using a plurality of triangle primitives, wherein each of the two quads comprises two of the plurality of triangle primitives, wherein the two quads corresponding to each linear segment of the plurality of linear segments are angled relative to one another and extend along the corresponding linear segment; and
      one or more operations to render the two quads for each of the plurality of linear segments.

2. The system of claim 1, wherein the one or more operations to shade the two quads include operations to calculate a plurality of proxy shading normals using a proxy infinite cone, corresponding to a plurality of hit points, to approximate an appearance of convex curve segments or round curve segments.

3. The system of claim 1, wherein the curve comprises a piecewise linear curve comprising the plurality of linear segments, and the operations executed by the one or more processors further comprise one or more operations to apply a radius expansion factor to the plurality of linear segments to match an average width of the plurality of linear segments to an intended radius from a plurality of viewing angles.

4. The system of claim 1, wherein at least one of:

each of the two quads is positioned on a corresponding linear segment of the plurality of linear segments;

each of the two quads spans the corresponding linear segment of the plurality of linear segments; or each of the plurality of linear segments is defined by two vertices, and the two vertices define midpoints of parallel edges defining each quad of the two quads.

5. The system of claim 4, wherein:

the two quads are transverse relative to one another; and the parallel edges defining each quad of the two quads intersect at an angle to form a cross-sectional view transversing along each of the plurality of linear segments.

6. The system of claim 4, wherein:

the two quads are orthogonal to one another; and the two vertices are at least one of (i) shared between one or more adjacent linear segments of the plurality of linear segments or (ii) independently positioned for each of the plurality of linear segments.

7. The system of claim 1, wherein:

each of the two quads has a length that is same as a length of a corresponding linear segment of the plurality of linear segments, and wherein one or more of the plurality of linear segments comprises a varying radius; and each of the two quads has a first width (w0) at a first vertex of the corresponding linear segment of the plurality of linear segments and a second width (w1) at a second vertex of the corresponding linear segment of the plurality of linear segments.

8. The system of claim 1, wherein:

each of the two quads has a width that is equivalent to a diameter of a corresponding linear segment of the plurality of linear segments; and each of the two quads is centered along the width of the corresponding linear segment of the plurality of linear segments.

9. The system of claim 1, wherein:

the plurality of linear segments comprises a first linear segment and a second linear segment connected to the first linear segment; and the two quads for the first linear segment and the two quads for the second linear segment are disjointed.

10. The system of claim 1, wherein:

the plurality of linear segments comprises a first linear segment and a second linear segment connected to the first linear segment; and at least one the two quads for the first linear segment and at least one the two quads for the second linear segment form a joint.

11. The system of claim 1, wherein the curve represents one or more of hair, fur, grass, wireframe rendering, 3D path rendering, 3D font rendering, 3D line drawings, carpet, lint, or cables.

12. The system of claim 1, wherein the one or more processors are comprised in at least one of:

a control system for an autonomous or semi-autonomous machine;

a perception system for an autonomous or semi-autonomous machine;

a system implemented using a robot;

an aerial system;

a medical system;

a boating system;

a smart area monitoring system;

a system for performing deep learning operations;

a system for performing simulation operations;

a system for generating or presenting virtual reality (VR) content, augmented reality (AR) content, or mixed reality (MR) content;

a system for performing digital twin operations;

a system implemented using an edge device;

a system incorporating one or more virtual machines (VMs);

a system for generating synthetic data;

a system implemented at least partially in a data center;

a system for performing conversational artificial intelligence (AI) operations;

a system for performing generative AI operations;

a system implementing language models;

a system for performing one or more operations using one or more vision language models (VLMs);

a system for performing one or more operations using one or more large language models (LLMs);

a system implementing multi-modal language models;

a system for hosting one or more real-time streaming applications;

a system for performing light transport simulation;

a system for performing collaborative content creation for 3D assets; or a system implemented at least partially using cloud computing resources.

13. One or more processors comprising:

one or more circuits to:

obtain an approximation of a three-dimensional (3D) curved structure having a plurality of linear segments;

determine two quadrilateral primitives (quads) for each of the plurality of linear segments using a plurality of triangle primitives, each of the two quads comprising two of the plurality of triangle primitives, wherein the two quads corresponding to a particular linear segment of the plurality of linear segments are angled relative to one another and extend along the particular linear segment; and render the two quads for each of the plurality of linear segments using a shader.

14. The one or more processors of claim 13, wherein the one or more circuits are to shade the two quads by calculating a plurality of proxy shading normals using a proxy infinite cone, corresponding to a plurality of hit points, to approximate an appearance of convex curve segments or round curve segments.

15. The one or more processors of claim 13, wherein:

the curved structure comprises a piecewise linear curve comprising the plurality of linear segments; and a radius expansion factor is applied to the plurality of linear segments to match an average width of the plurality of linear segments to an intended radius from a plurality of viewing angles.

16. The one or more processors of claim 13, wherein at least one of:

each of the two quads is positioned on a corresponding linear segment of the plurality of linear segments;

each of the two quads spans the corresponding linear segment of the plurality of linear segments; or each of the plurality of linear segments is defined by two vertices, and the two vertices define midpoints of parallel edges defining each of the two quads.

17. The one or more processors of claim 16, wherein:

the two quads are transverse relative to one another; and the two vertices on each of the two quads intersect at an angle to form a cross-sectional view transversing along each of the plurality of linear segments.

18. The one or more processors of claim 16, wherein:

the two quads are orthogonal to one another; and the two vertices are at least one of (i) shared between one or more adjacent linear segments of the plurality of linear segments or (ii) independently positioned for each of the plurality of linear segments.

19. The one or more processors of claim 13, wherein:

each of the two quads has a length that is same as a length of a corresponding linear segment of the plurality of linear segments, and wherein each of the plurality of linear segments comprises a varying radius; and each of the two quads has a first width (w0) at a first vertex of the corresponding linear segment of the plurality of linear segments and a second width (w1) at a second vertex of the corresponding linear segment of the plurality of linear segments.

20. A method, comprising:

approximating, using one or more processors, a three dimensional (3D) curve comprising a plurality of linear segments;

determining, using the one or more processors, at least two quadrilateral primitives (quads) for each of the plurality of linear segments using a plurality of triangle primitives, each of the at least two quads comprising at least two of the plurality of triangle primitives, wherein the at least two quads corresponding to the same linear segment of the plurality of linear segments extend along the same direction as the corresponding linear segment and are angled relative to one another; and rendering, using a shader executed using the one or more processors, the two quads for each of the plurality of linear segments.

* * * * *